United States Patent
Lee et al.

(10) Patent No.: US 9,805,055 B2
(45) Date of Patent: Oct. 31, 2017

(54) METHOD AND APPARATUS FOR READING DATA IN DISTRIBUTED FILE SYSTEM

(71) Applicant: ELECTRONICS AND TELECOMMUNICATIONS RESEARCH INSTITUTE, Daejeon (KR)

(72) Inventors: Sang-Min Lee, Daejeon (KR); Hong-Yeon Kim, Daejeon (KR); Young-Kyun Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 317 days.

(21) Appl. No.: 14/629,513

(22) Filed: Feb. 24, 2015

(65) Prior Publication Data
US 2015/0242437 A1    Aug. 27, 2015

(30) Foreign Application Priority Data
Feb. 26, 2014    (KR) .................. 10-2014-0022718

(51) Int. Cl.
G06F 17/30 (2006.01)
H04L 29/08 (2006.01)

(52) U.S. Cl.
CPC .. G06F 17/30194 (2013.01); G06F 17/30168 (2013.01); H04L 67/2842 (2013.01)

(58) Field of Classification Search
CPC ......... G06F 17/30194; G06F 17/30168; H04L 67/2842
See application file for complete search history.

(56) References Cited

U.S. PATENT DOCUMENTS

| 5,970,229 A | 10/1999 | Thomas et al. |
| 7,837,767 B2 | 11/2010 | Brettschneider et al. |
| 2012/0150924 A1 | 6/2012 | Lee et al. |
| 2012/0163394 A1 | 6/2012 | Chen et al. |
| 2012/0239749 A1 | 9/2012 | Aronovich et al. |

FOREIGN PATENT DOCUMENTS

| KR | 10-2010-015860 A | 2/2010 |
| KR | 10-2012-0064576 A1 | 6/2012 |

OTHER PUBLICATIONS

Daniel Ellard et al, "NFS Tricks and Benchmarking Traps", USENIX 2003 Annual Technical Conference, FREENIX Track, pp. 101-114, Jun. 9-14, 2003.

*Primary Examiner* — Jorge A Casanova
(74) *Attorney, Agent, or Firm* — Rabin & Berdo, P.C.

(57) ABSTRACT

Disclosed are a method and apparatus for reading data in a distributed file system in which a client and a server are separated. In the method and apparatus, a prefetching operation is performed to provide a continuous read function with high performance even in the distributed file system so that an optimum continuous read function of a local file system within the client may be effectively supported when an application program of the client requests continuous reading on a file (or chunk).

13 Claims, 29 Drawing Sheets

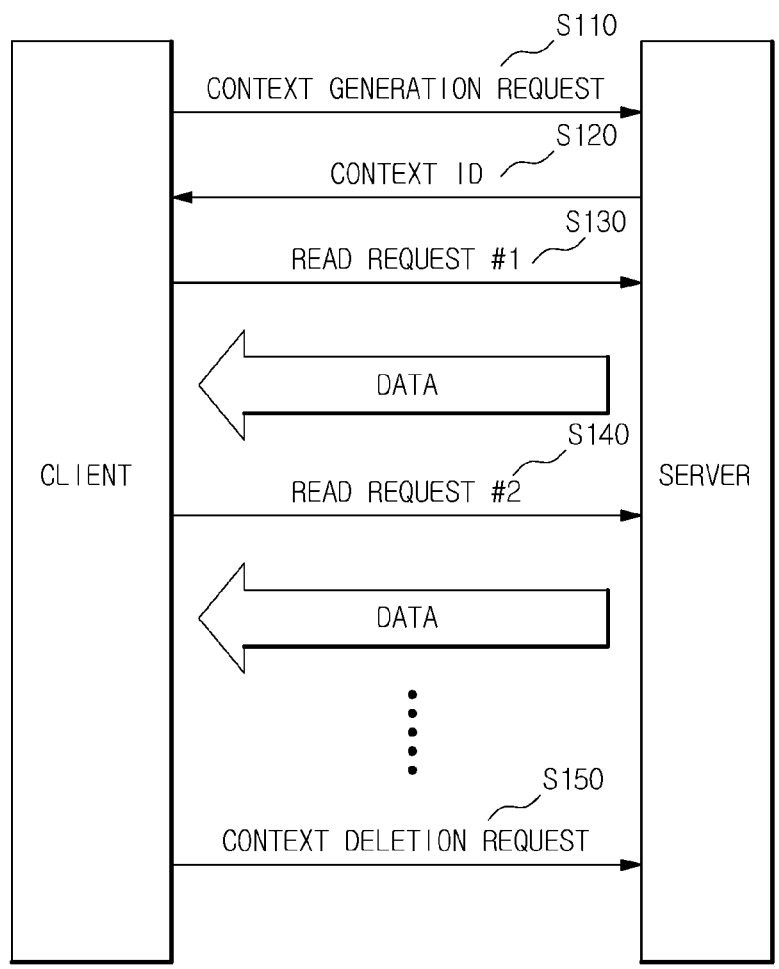

CLIENT CONTEXT STRUCTURE

SERVER CONTEXT STRUCTURE

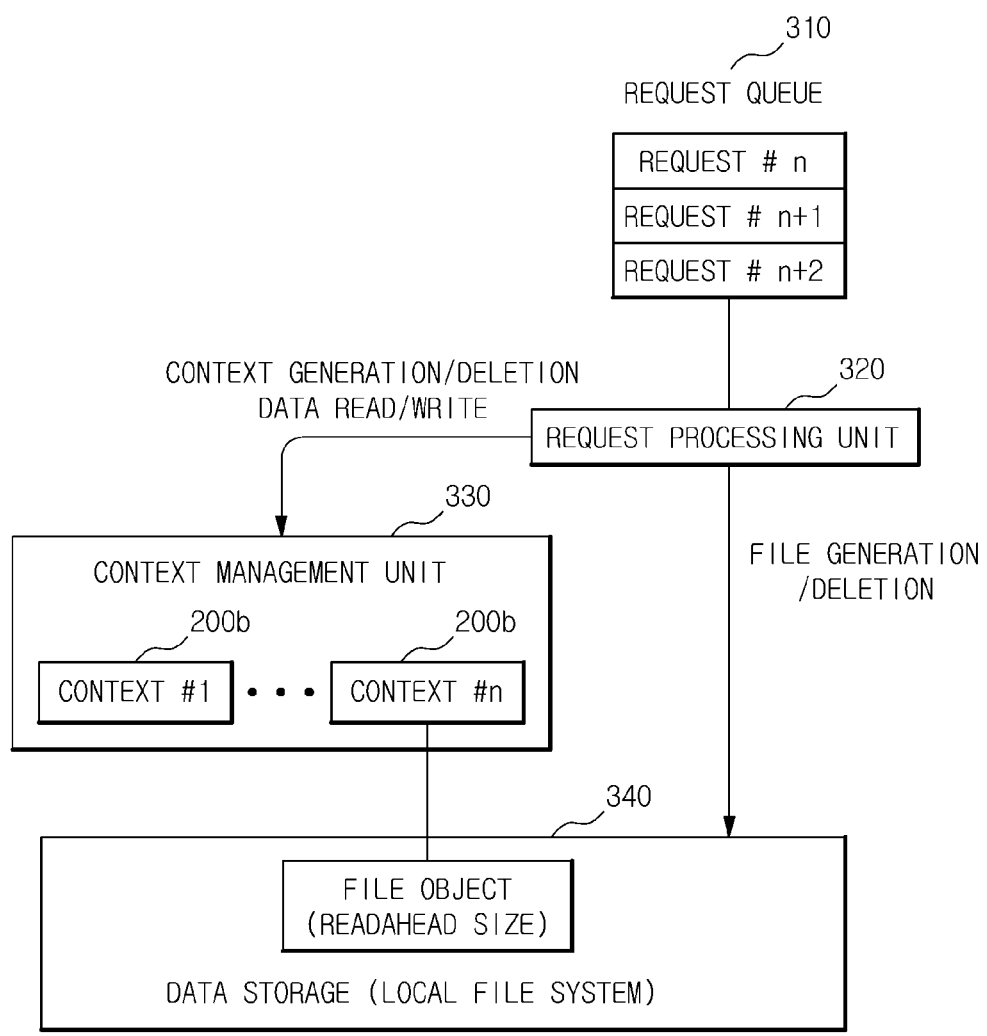

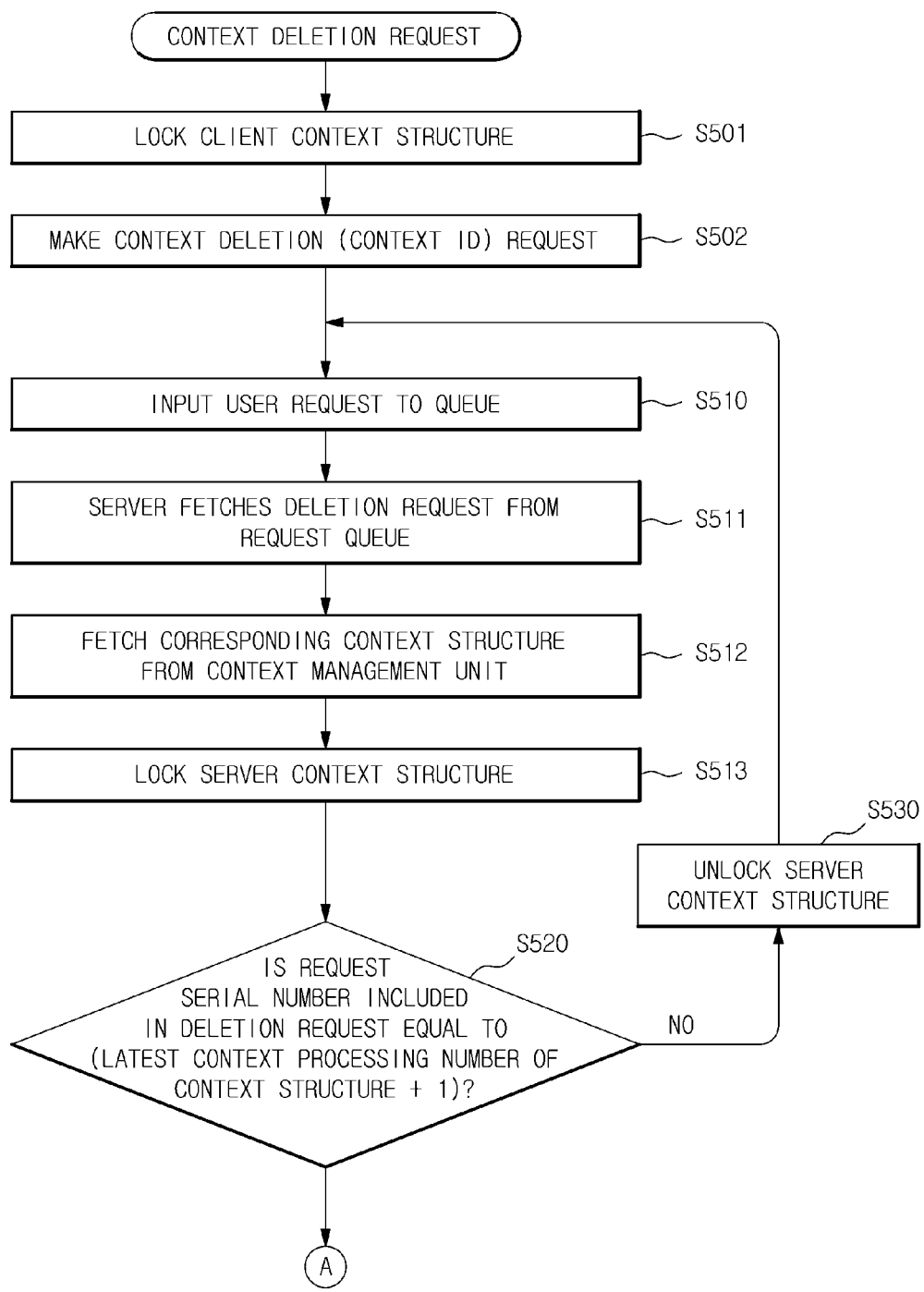

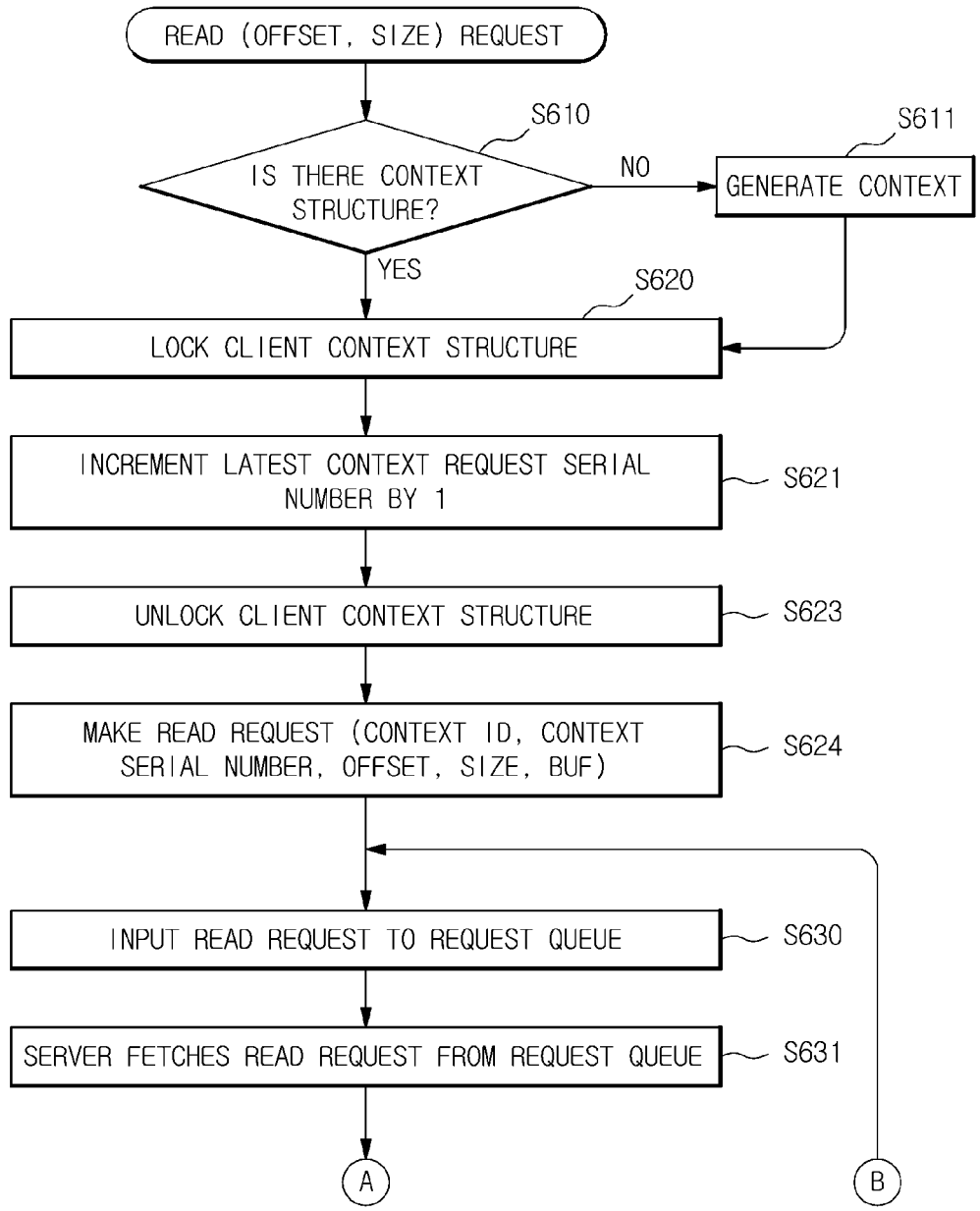

FIG. 8A

```
ra_mutex (CONTEXT LOCK)
ra_id (CONTEXT ID)
max_ra_size (MAXIMUM READAHEAD SIZE)
ra_ver (CONTEXT VERSION)
ra_seq (LATEST CONTEXT SERIAL NUMBER)
ra_start (CONTEXT START POSITION)
ra_size (CONTEXT SIZE)
ra_async_size (ASYNCHRONOUS CONTEXT REQUEST SIZE)
```

FIG. 8B

```
ra_mutex (CONTEXT LOCK)
ra_id (CONTEXT ID)
max_ra_size (MAXIMUM READAHEAD SIZE)
ra_ver (CONTEXT VERSION)
ra_seq ( LATEST CONTEXT SERIAL NUMBER)
ra_size (READAHEAD SIZE)
buf (MEMORY BUFFER)
fd
```

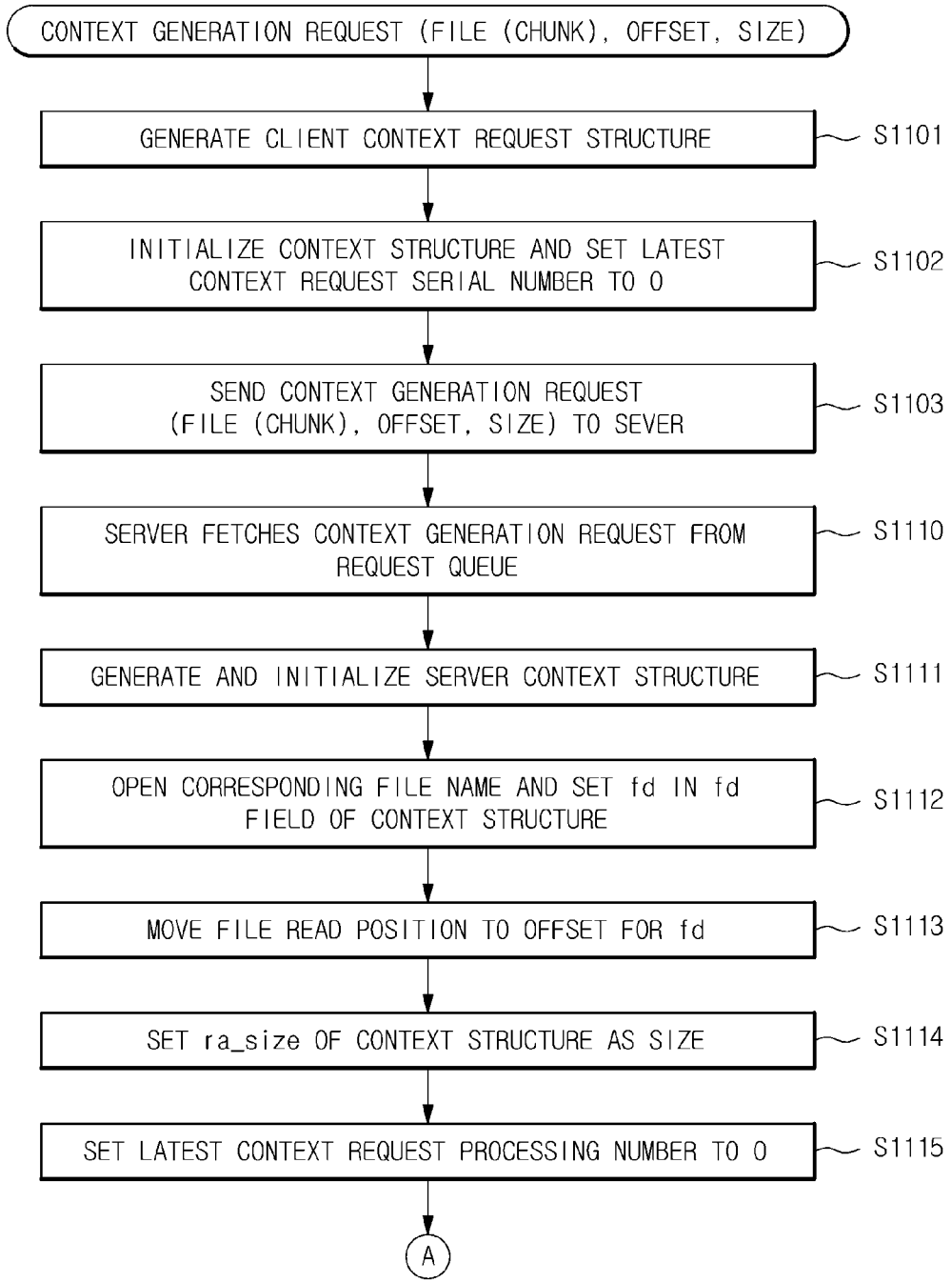

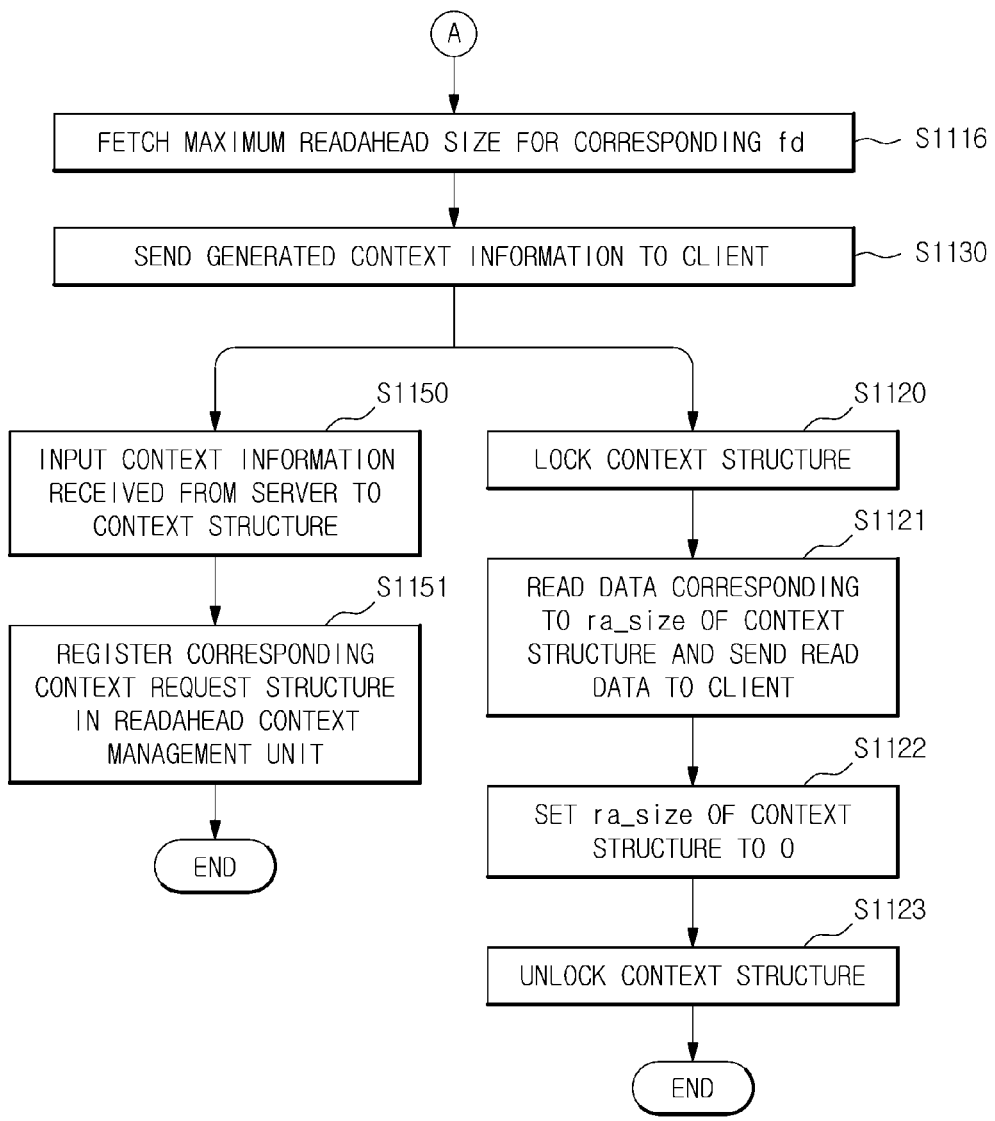

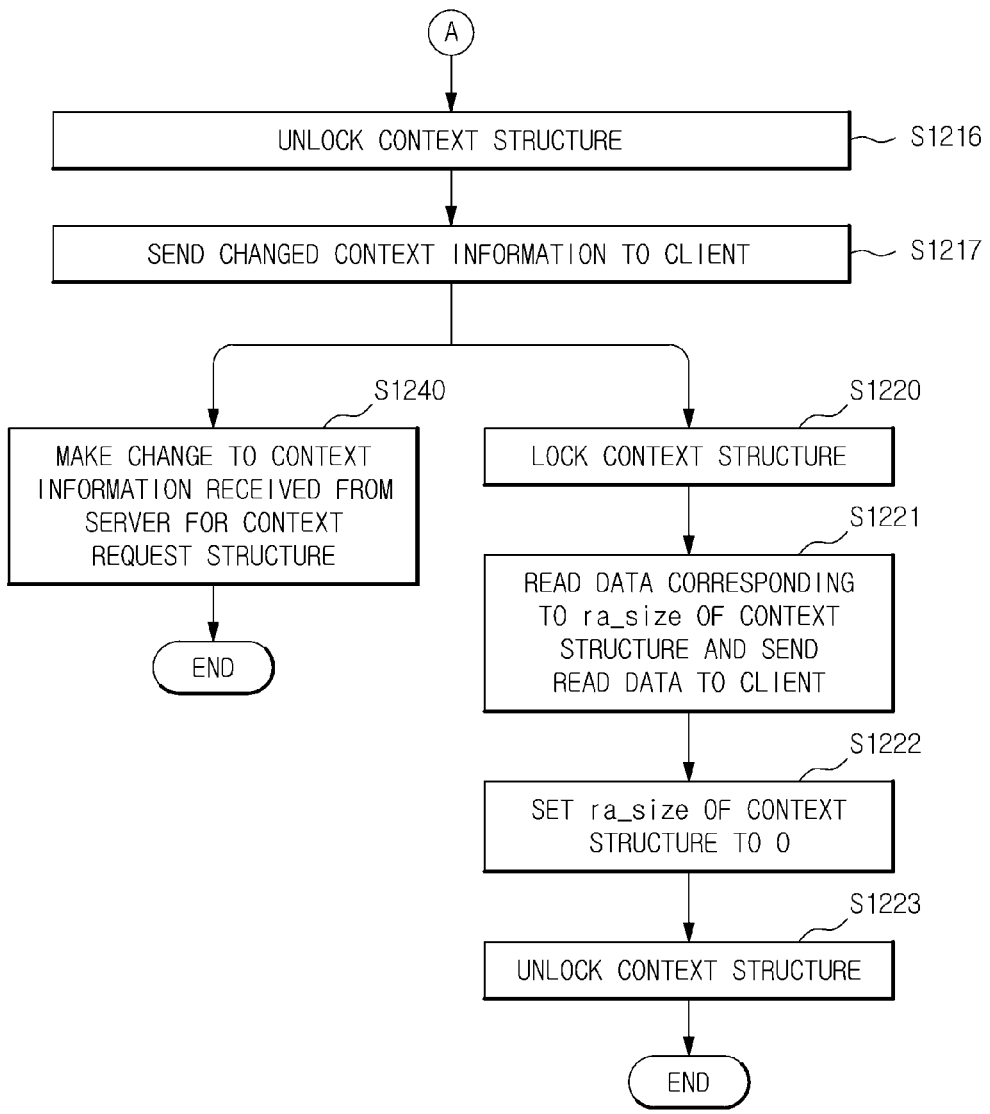

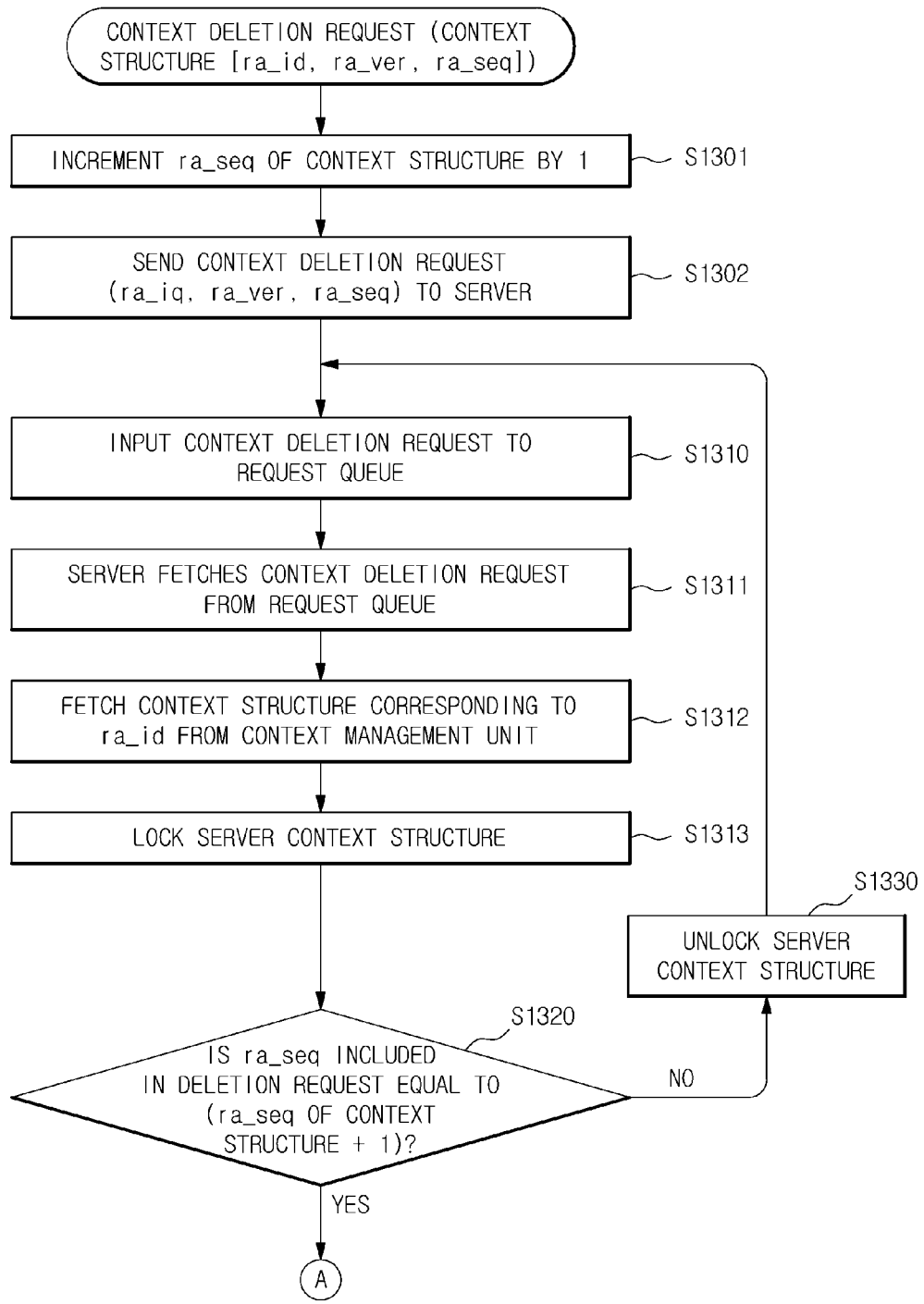

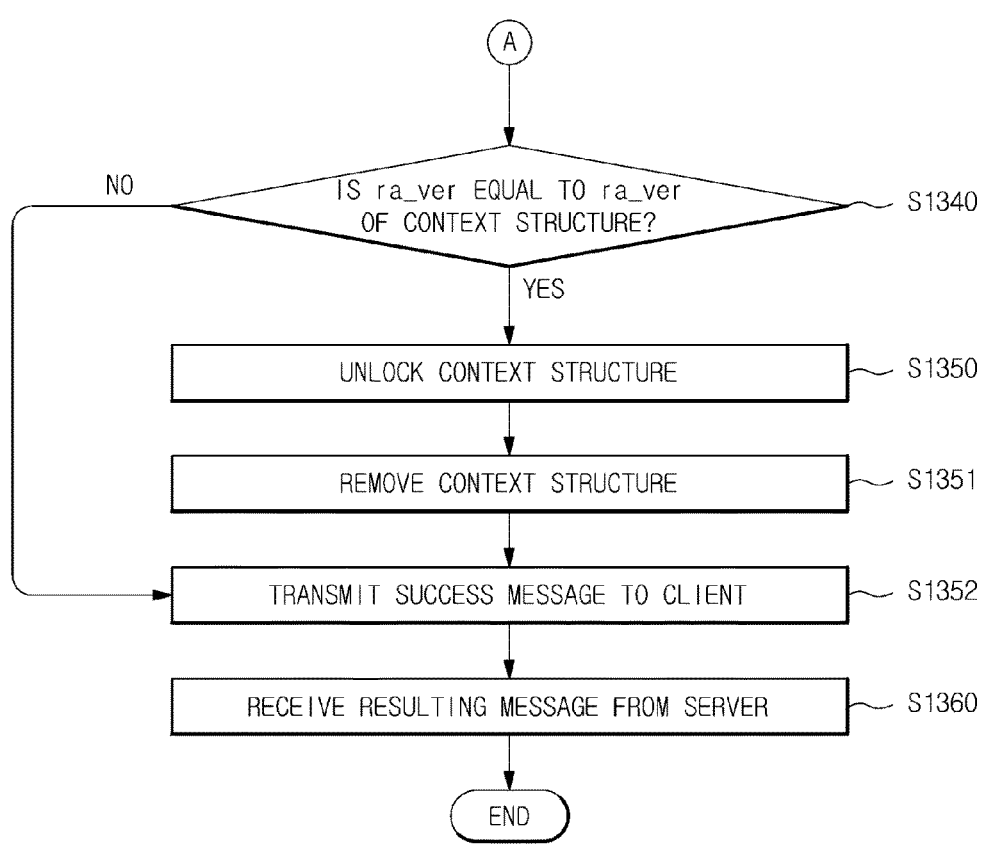

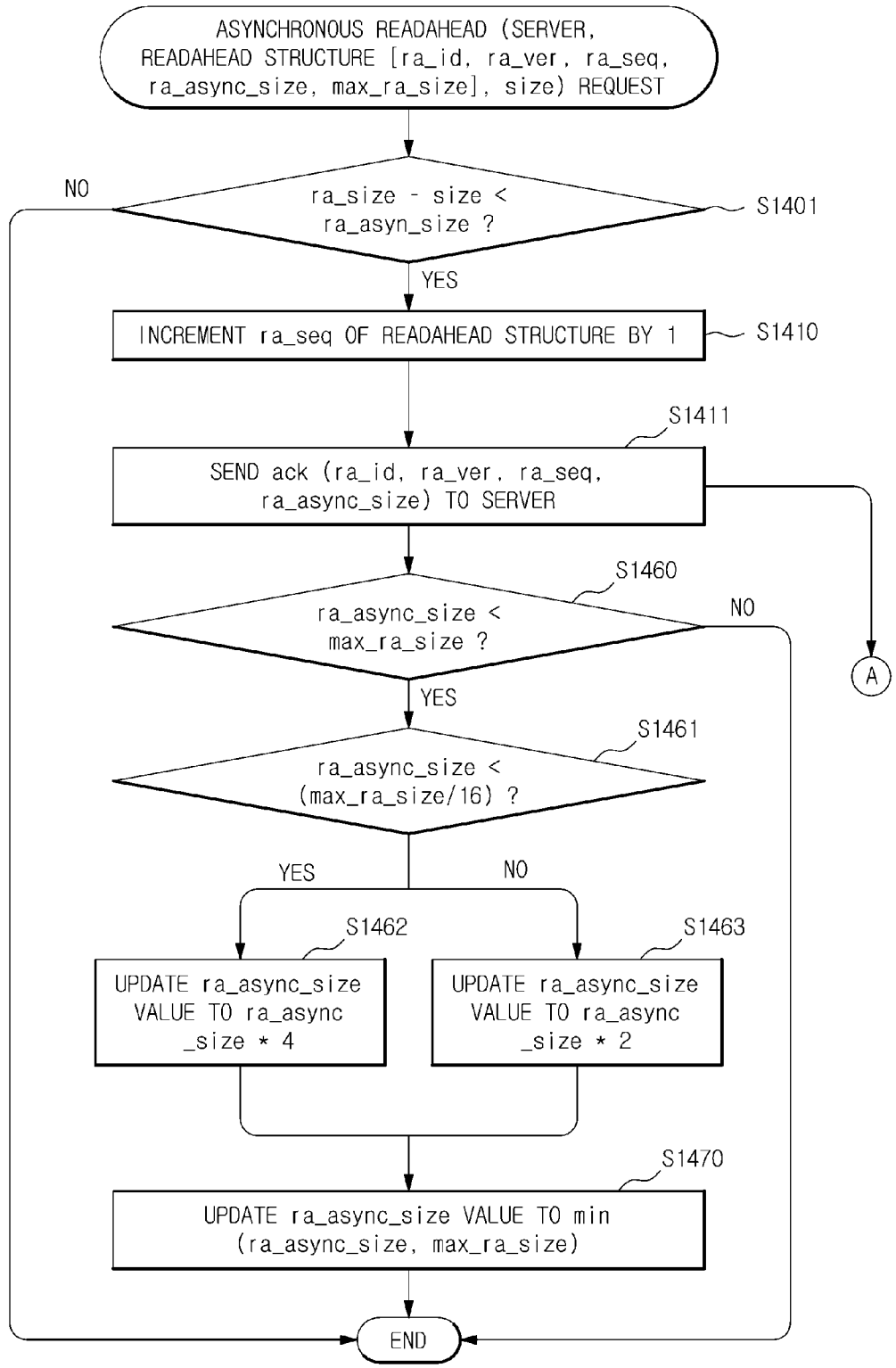

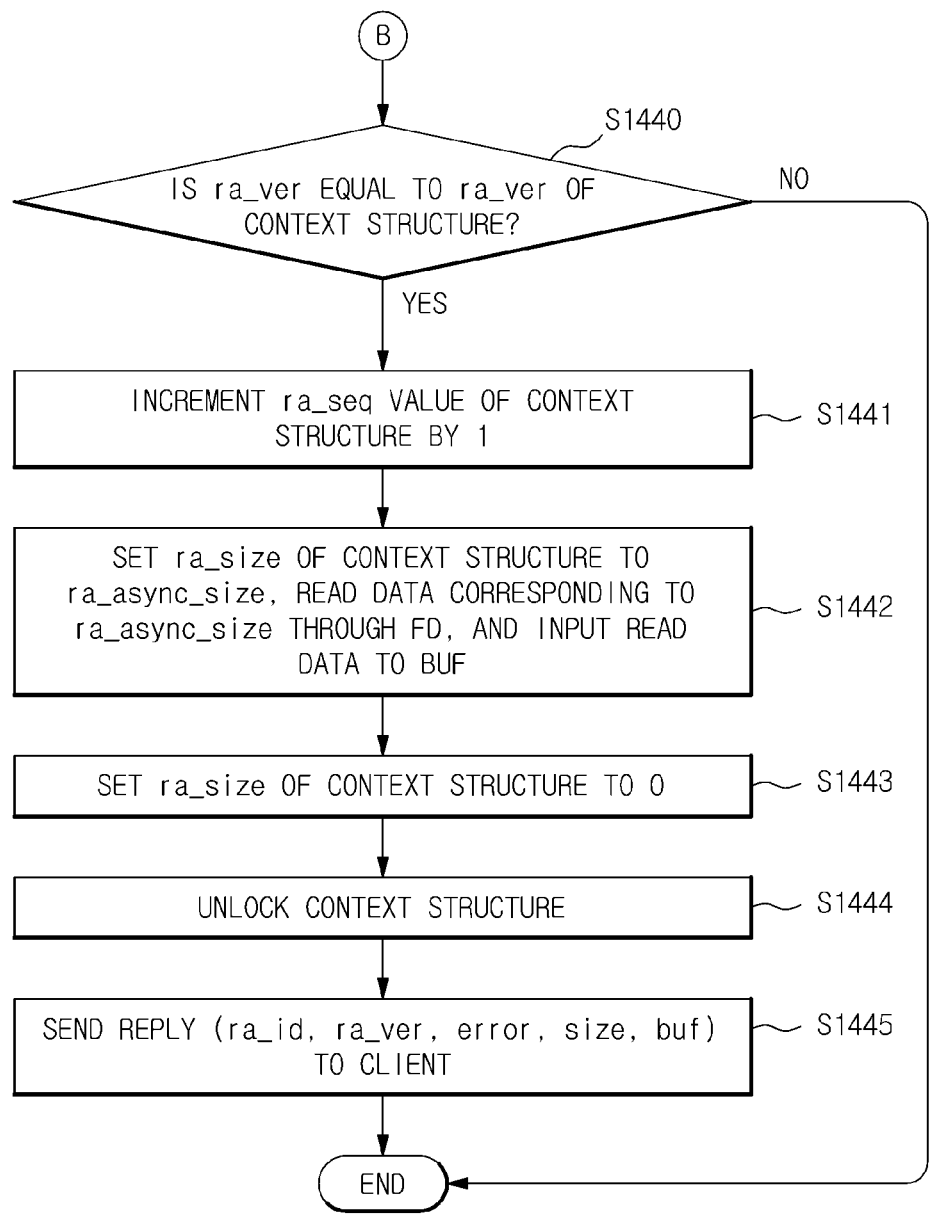

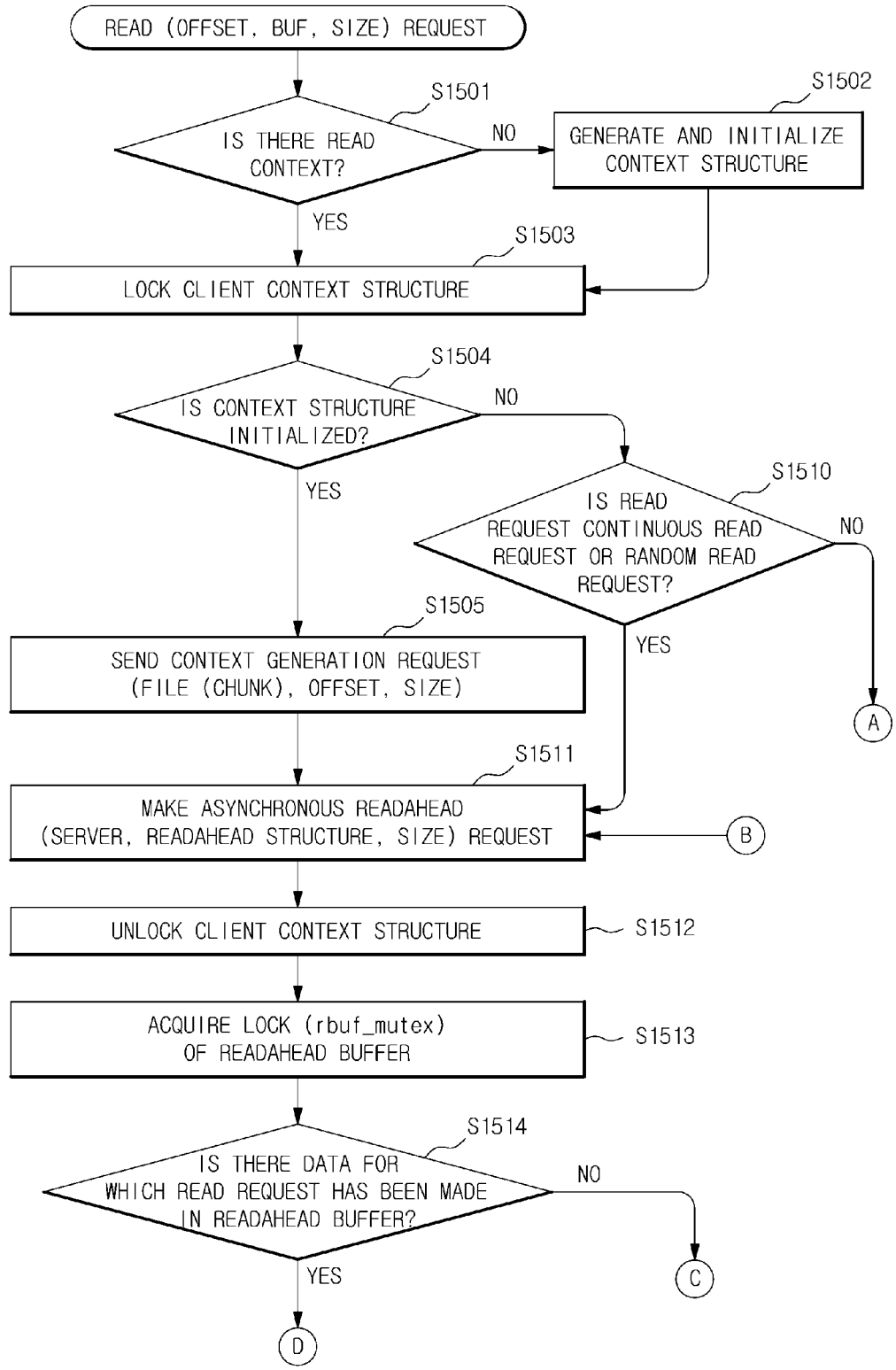

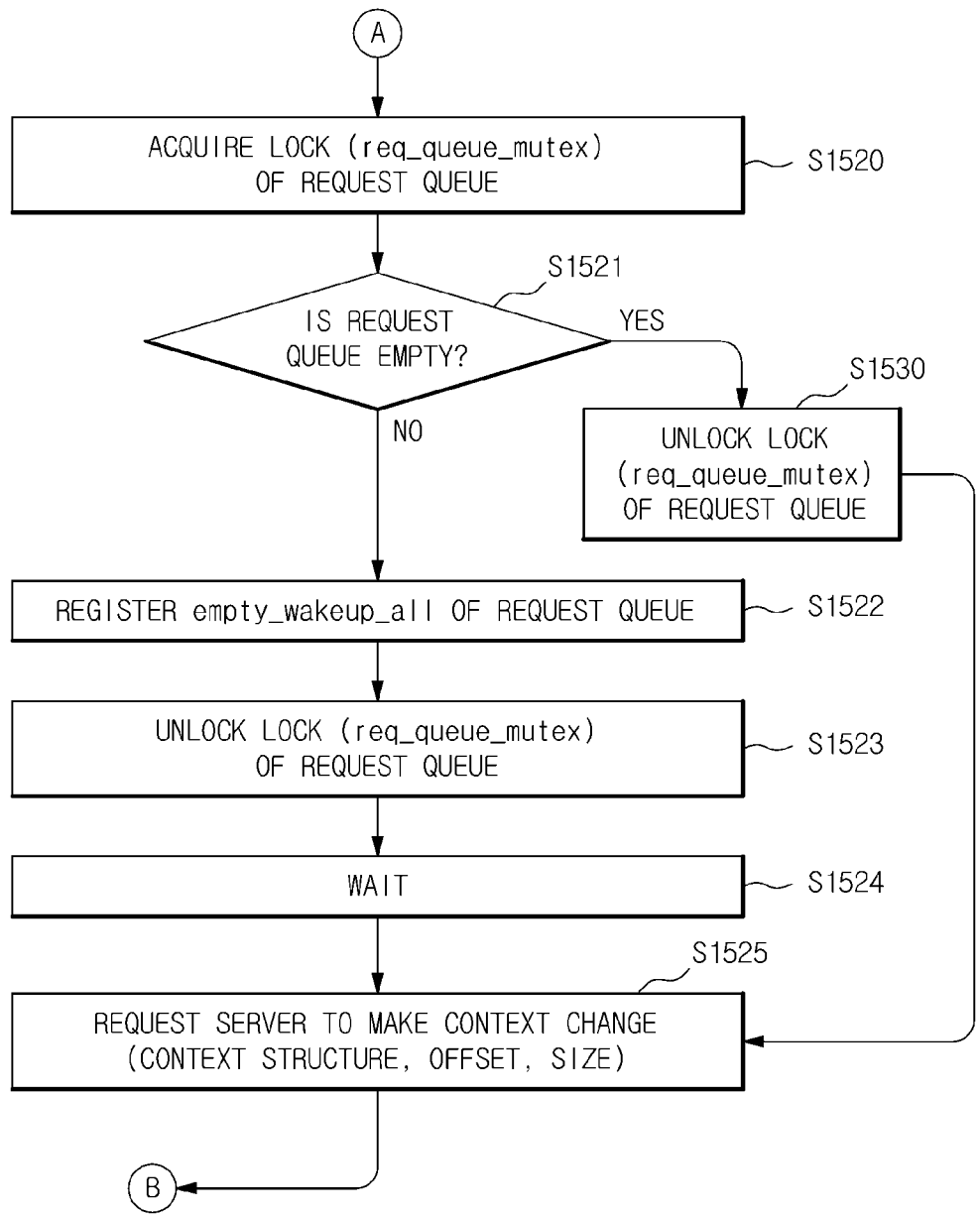

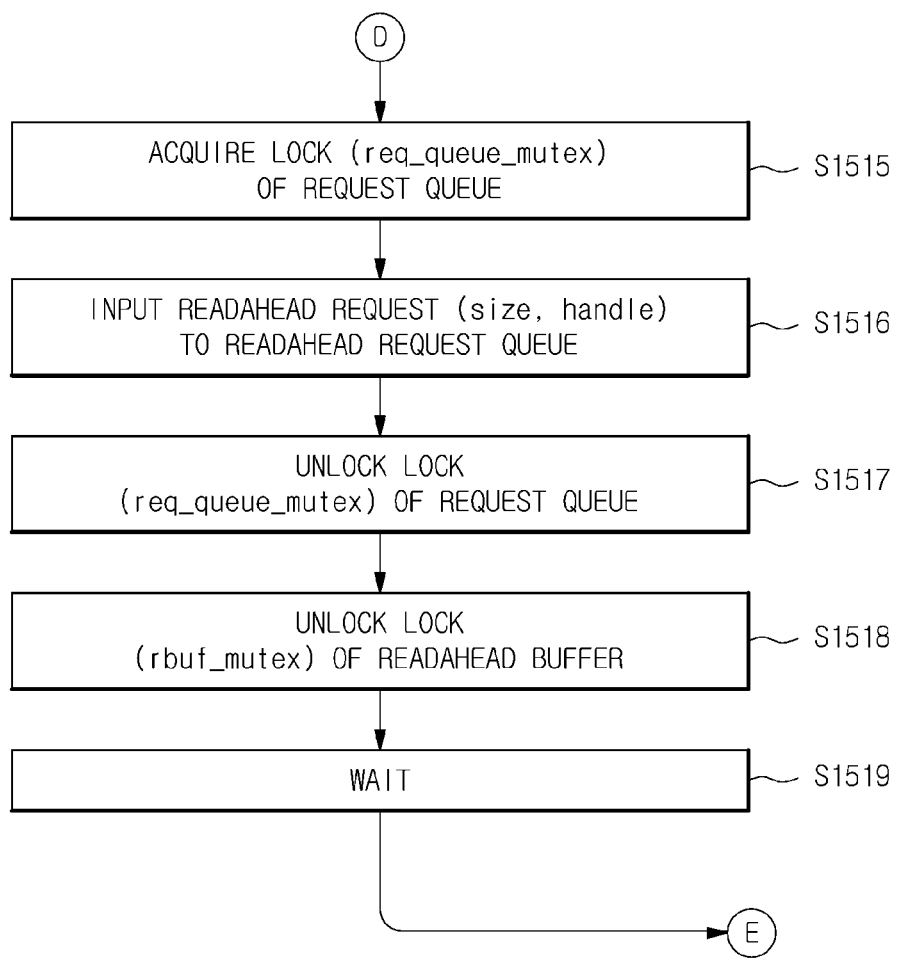

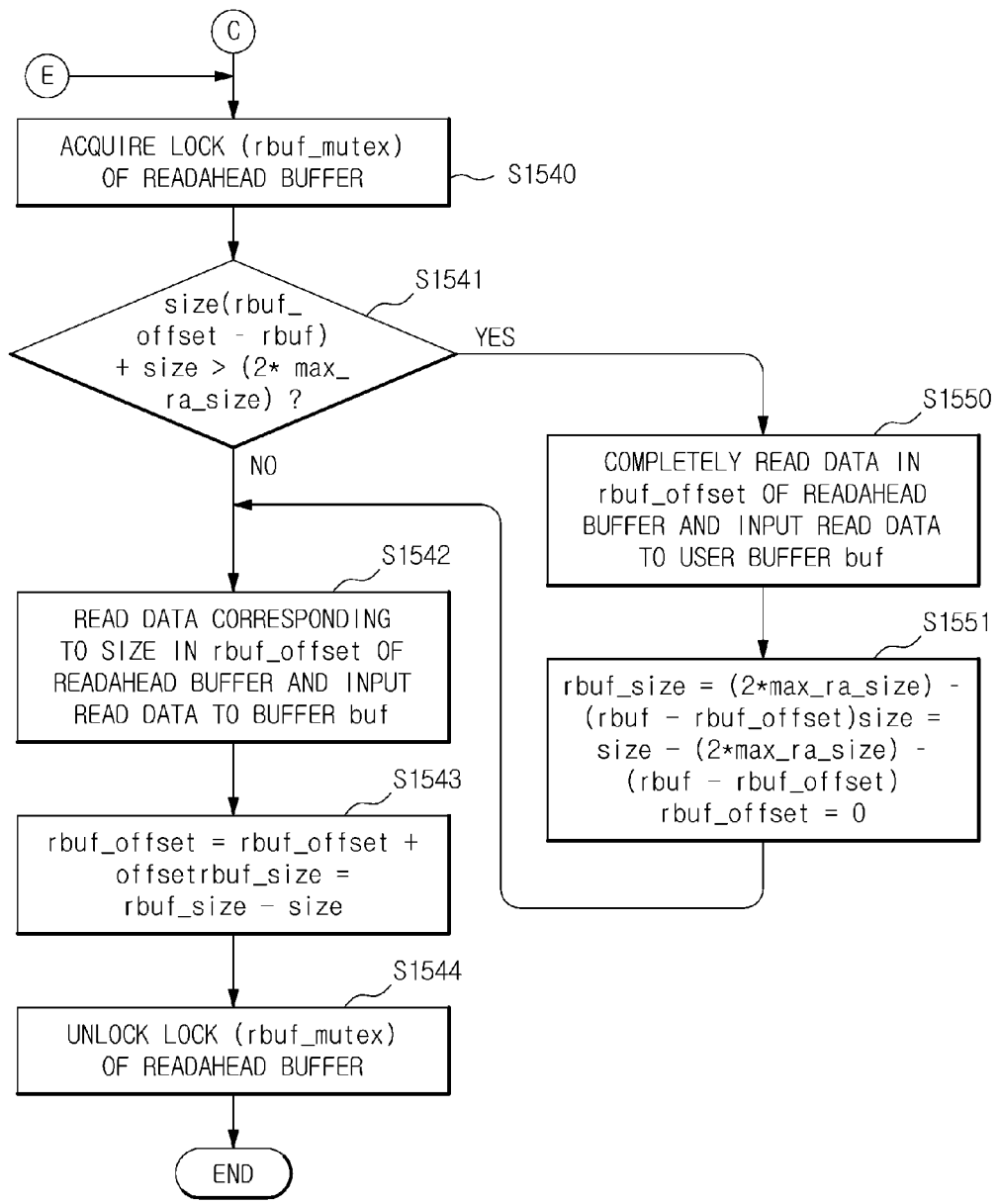

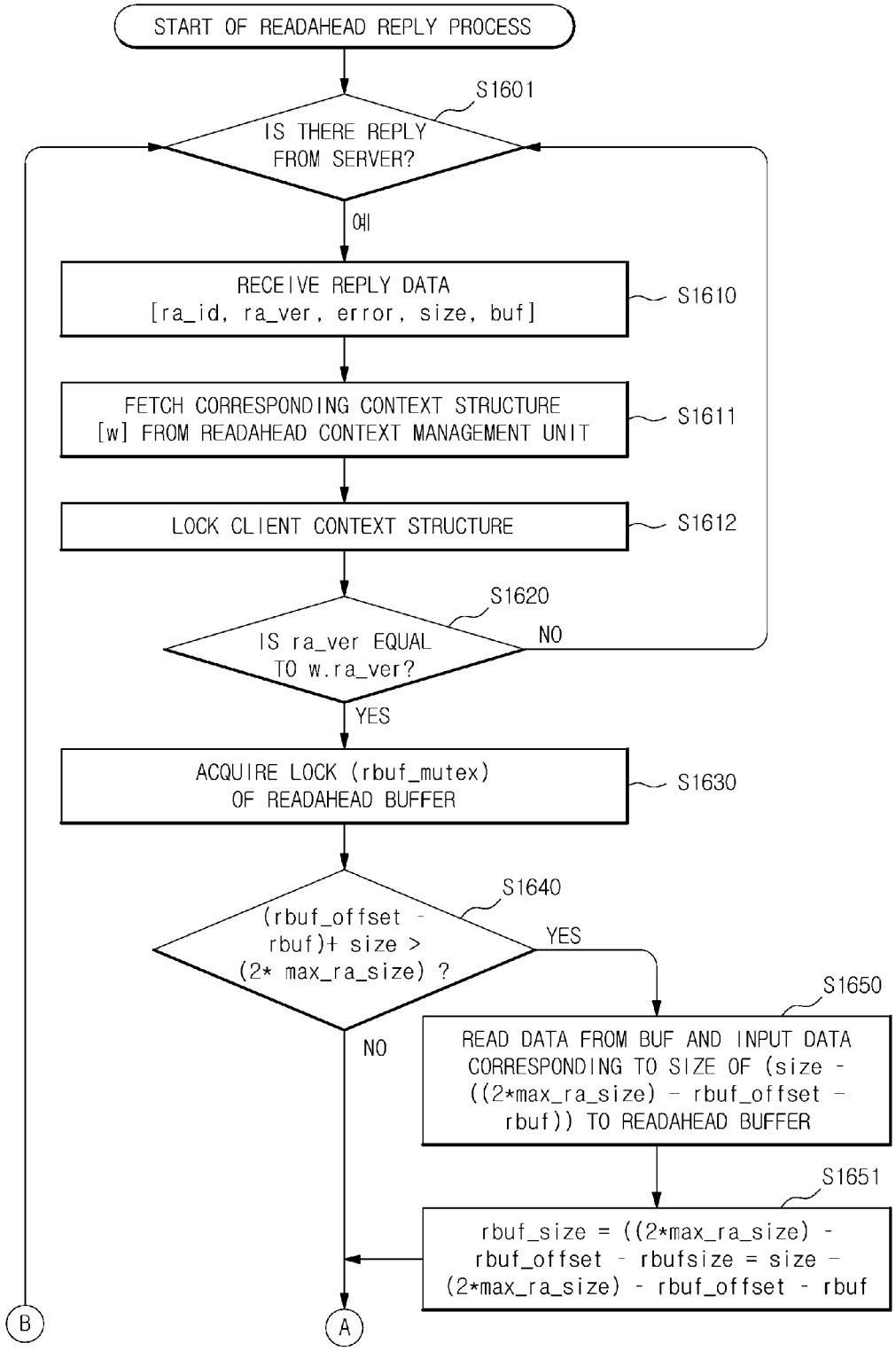

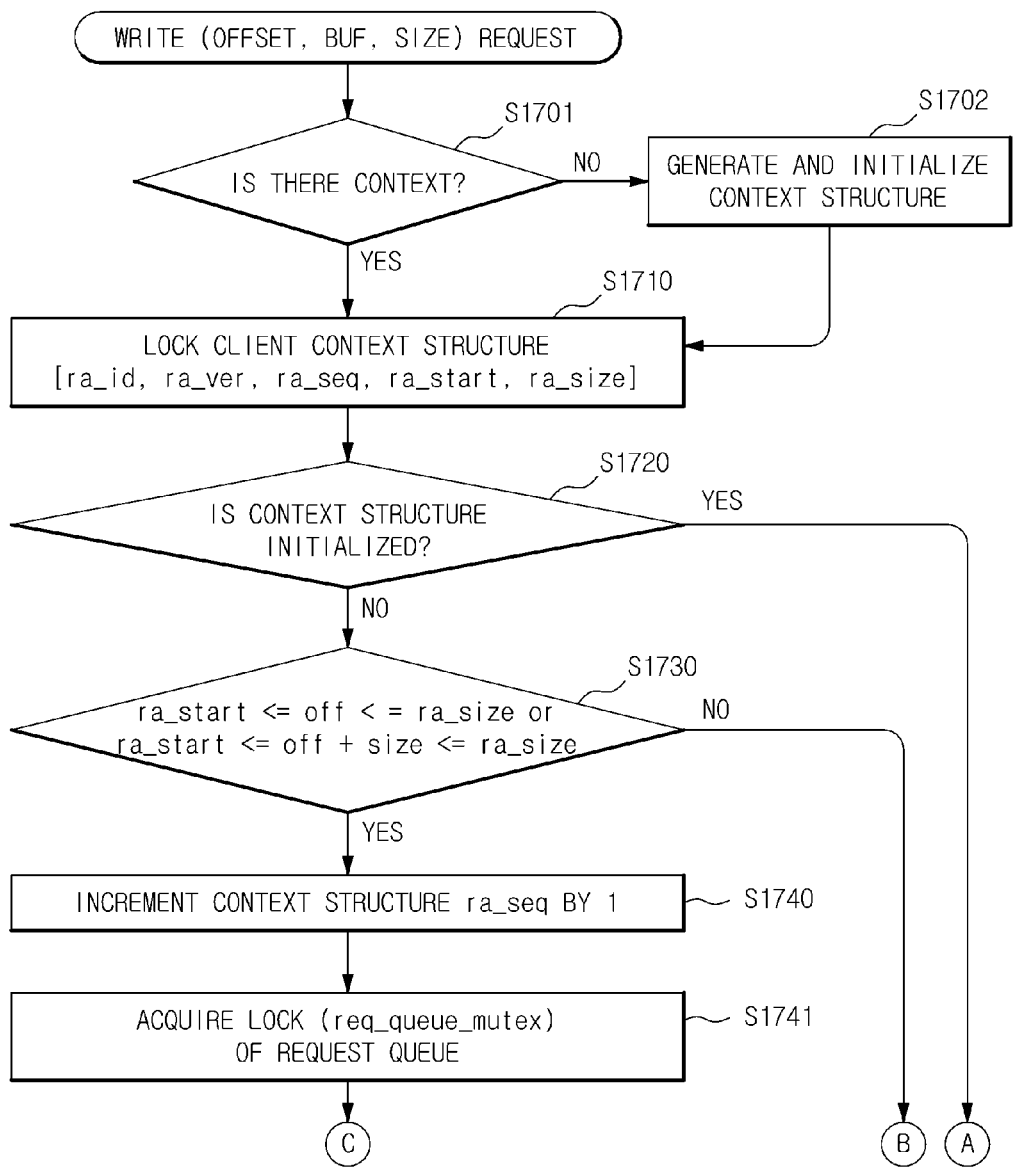

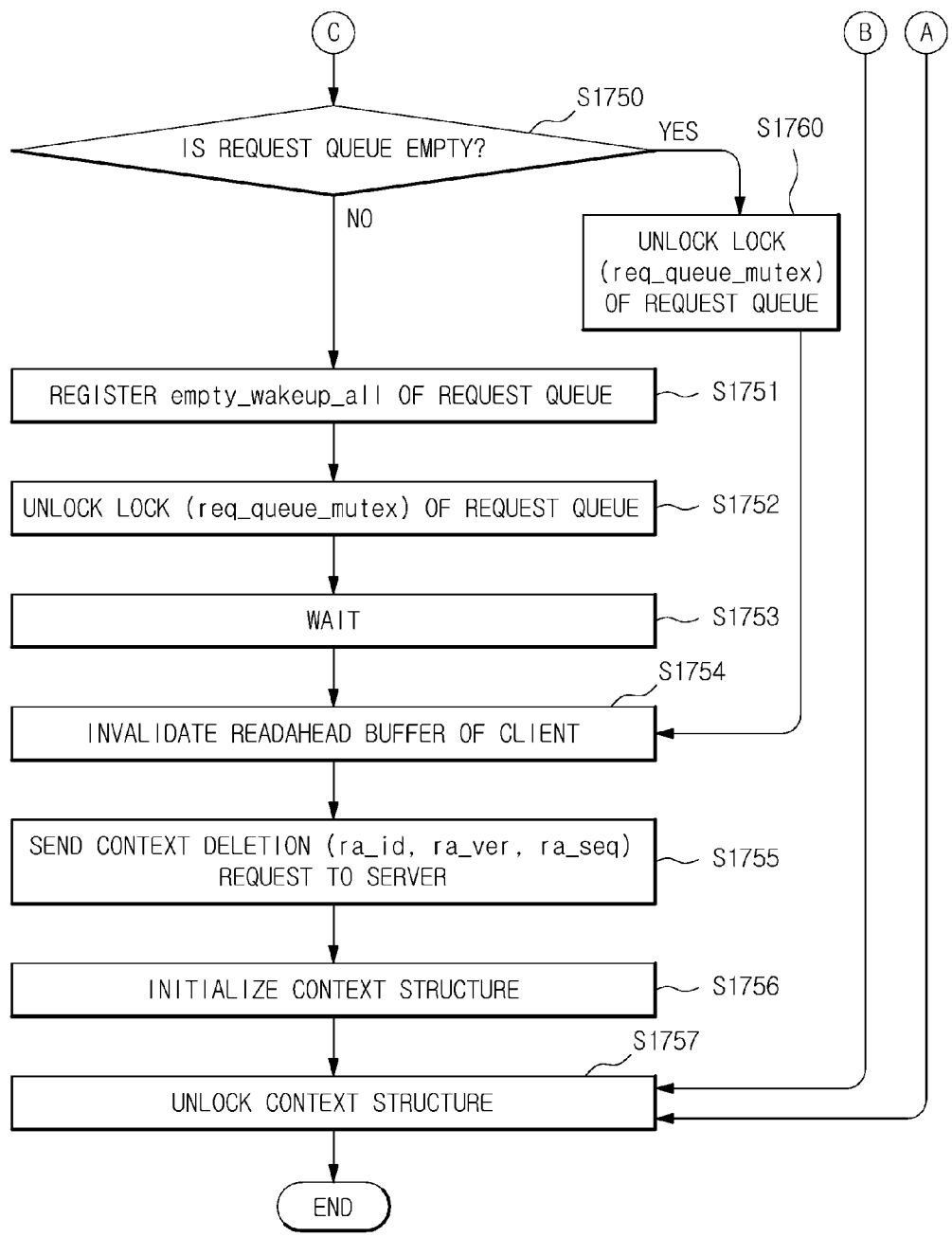

METHOD AND APPARATUS FOR READING DATA IN DISTRIBUTED FILE SYSTEM

CROSS-REFERENCE TO RELATED APPLICATION

This application claims priority to and the benefit of Korean Patent Application No. 10-2014-0022718, filed on Feb. 26, 2014, the disclosure of which is incorporated herein by reference in its entirety.

BACKGROUND

1. Field of the Invention

The present invention relates to a method and apparatus for reading data in a distributed file system in which a client and a server are separated, and more particularly, to a method and apparatus for performing a prefetching operation to provide a continuous read function with high performance even in a distributed file system so that an optimum continuous read function of a local file system within the client may be effectively supported when an application program of the client requests continuous reading on a file (or chunk).

2. Discussion of Related Art

In general, a file system performs prefetching to effectively process continuous file reading of an application program. The prefetching is a function of processing a read request of a user and continuous reading of the next block in preparation of the next continuous reading together. In the prefetching operation, the read request may be processed within a short response for the next reading. For this, the file system maintains a readahead window structure according to each open file. Within this structure, an offset which is information of a position at which a read operation has recently been requested in an application program and readahead size information are maintained.

The readahead operation of a local file system is different from that of the distributed file system. In the distributed file system, the server also needs to perform the readahead operation simultaneously when the readahead operation is performed in a client file system. Thus, the following problems may occur in the distributed file system.

1. Reordering

The execution order of a continuous readahead request occurring in the readahead operation of the client can be changed in a request processing unit of the server. Thus, a readahead window size of the local file system of the server is reduced and therefore efficiency of the readahead operation may be degraded.

2. Readahead Window Mismatch

Because the client and the server simultaneously perform the readahead operation in the distributed file system, continuous reading may be inefficiently performed when a readahead technique is different between the client and the server. For example, the above-described problem may occur when the readahead size of the client is greater or less than that of the server.

SUMMARY OF THE INVENTION

The present invention is directed to solve the above-described reordering and readahead window mismatch so as to ensure the optimized performance of continuous reading in a distributed file system.

Also, the present invention is directed to enable a distributed file system to exhibit similar performance to continuous reading in a local file system by performing a readahead operation in a pipeline scheme and performing a disk input/output (I/O) and a network I/O in an interleaving scheme.

According to one exemplary embodiment of the present invention, there is provided a method of reading data in a distributed file system, the method including: generating, by a server, a context structure including a context identifier (ID) and a file descriptor (fd) for a file when a context generation request for a read target file is received from a client and transmitting the context ID to the client; receiving, by the server, a plurality of read requests, each read request including a context ID, a latest context request serial number, an offset indicating a requested read position, and read size information corresponding to the file; and sequentially processing, by the server, the plurality of read requests by referring to the context request serial number included in each read request.

In the exemplary embodiment, the context structure generated by the server may further include a context lock item for concurrency control of request processing for the context.

In the exemplary embodiment, the context structure generated by the server may further include a latest context processing number indicating a recently processed request number for the context, and the latest context processing number may be initially set to 0 and incremented by 1 every time a request for a file related to the context is processed.

In the exemplary embodiment, the context structure including the context ID received from the server may be generated and stored in the client, the context structure of the client may further include a context lock item for concurrency control of request processing for the context and a latest context request serial number in addition to the context ID, and the latest context request serial number may be initially set to 0 and incremented by 1 every time a request for a file related to the context is generated.

In the exemplary embodiment, the sequentially processing of the plurality of read requests may include: determining whether the read request is a reordered request by comparing a context processing request serial number included in the read request to a latest context processing number included in the context structure of the server; making the read request wait until processing for a request previous to the read request is completed in case that the read request is the reordered request; and processing the read request after processing for the previous request is completed.

In the exemplary embodiment, the method may further include: when a deletion request for the generated context is received from the client, determining whether the deletion request is a reordered request by comparing a context processing request serial number included in the deletion request to a latest context processing number included in the context structure of the server; making the read request wait until processing for a request previous to the read request is completed when it is determined that the deletion request is the reordered request; and deleting the context structure for which the deletion request has been made after the processing for the previous request is completed.

According to another exemplary embodiment of the present invention, there is provided a method of reading data in a distributed file system, the method including: when a context generation request including an offset and readahead size information for a read target file is received from a client, generating, by a server, a context structure including a context ID and an fd for a file and transmitting the context ID to the client; and performing a readahead operation on the file based on the offset and the readahead size information included in the context generation request and transmitting data read in advance to the client.

In the exemplary embodiment, the context structure generated by the server may further include at least one of a context lock item for concurrency control of request processing for the context, a maximum readahead size of the server, a context version number, a latest context processing number indicating a recently processed request number for the context, a readahead size, and a memory buffer address in addition to the context ID and the fd, and the latest context processing number may be initially set to 0 and incremented by 1 every time a request for a file related to the context is processed.

In the exemplary embodiment, the context structure including the context ID received from the server may be generated and stored in the client, the context structure of the client may further include at least one of a context lock item, a maximum readahead size of the server, a context version number, a latest context request serial number, a readahead start position, a readahead request size, and asynchronous readahead request size information in addition to the context ID, and the latest context request serial number may be initially set to 0 and incremented by 1 every time a request for a file related to the context is generated.

In the exemplary embodiment, the data read in advance transmitted to the client may be stored in a readahead buffer of the client, and a readahead buffer size of the client may be twice a maximum readahead size of the server.

In the exemplary embodiment, the method may further include: when continuous reading on the file is requested from an application program to be executed in the client, transmitting, by the client, a readahead request including asynchronous readahead request size information to the server if a size of the remaining data of a readahead buffer, which has not been yet read by the application program, is less than a preset asynchronous readahead request size; performing, by the server receiving the readahead request, an synchronous readahead operation on the file in correspondence with the asynchronous readahead request size; and transmitting data read in advance to the client.

In the exemplary embodiment, the preset asynchronous readahead request size may be able to be increased to a maximum readahead size of the server.

In the exemplary embodiment, the readahead request may further include a context processing request serial number, and the performing of the readahead operation may include: determining whether the readahead request is a reordered request by comparing a context processing request serial number included in the readahead request to a latest context processing number included in the context structure of the server; making the readahead request wait until processing for a request previous to the readahead request is completed in case that the readahead request is the reordered request; and processing the readahead request after processing for the previous request is completed.

In the exemplary embodiment, the method may further include: when a random read operation on the file is requested from an application program to be performed by the client, increasing, by the client, a context version number within a context structure related to the file and transmitting a context change request including the increased version number, a context ID, an offset, and readahead size information to the server; and changing, by the server receiving the context change request, a context version number of the context structure for which the change request has been made to a version number included in the change request, performing a readahead operation on the file using the offset and the readahead size information included in the change request, and transmitting data read in advance to the client.

In the exemplary embodiment, the method may further include: when a deletion request for the generated context is received from the client, determining whether the deletion request is a reordered request by comparing a context processing request serial number included in the deletion request to a latest context processing number included in the context structure of the server; making the read request wait until processing for a request previous to the read request is completed when it is determined that the deletion request is a reordered request; and deleting the context structure for which the deletion request has been made after the processing for the previous request is completed.

According to still another exemplary embodiment of the present invention, there is provided a method of reading data in a distributed file system, the method including: determining, by a client, whether there is a context structure for a file when a read request for a file is received from an application program, wherein the read request includes an offset and read size information; determining whether the read request is a continuous read request or a random read request by comparing the offset included in the read request to a read start position included in the context structure when the context structure for the file is present; requesting the server to perform an asynchronous readahead operation on the file when it is determined that the read request is the continuous read request; and requesting the server to change the context when the read request is the random read request.

In the exemplary embodiment, the method may further include: requesting the server to generate a context structure for the file when there is no context structure for the file.

In the exemplary embodiment, requesting the server to change the context may include: determining whether an asynchronous readahead request for the context waits in a request queue; making the request wait and processing the asynchronous readahead request waiting in the request queue to empty the request queue; and transmitting the change request to the sever after the request queue is empty.

In the exemplary embodiment, the method may further include: when a write request for the file is received from the application program, determining whether the write-requested portion of the file is included in a readahead window; invalidating a readahead buffer when the write-requested portion is included in the readahead window; and requesting the server to delete the context.

According to the present invention, it is possible to ensure the optimized performance of continuous reading in a distributed file system.

The present invention is applicable to a large-capacity asymmetric distributed file system including a plurality of various servers as well as generally used distributed file systems. The maximum reading performance may be ensured even when one file is divided into chunks each having a maximum fixed length (for example, 64 megabytes (MB)), and the chunks are stored in various servers of the asymmetric distributed file system.

In addition, the optimized performance of continuous reading according to each characteristic may be ensured even in a hybrid storage hierarchically configured according to characteristics of a storage device.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which:

FIG. 1 is a diagram illustrating a process of performing a read operation according to an exemplary embodiment of the present invention;

FIG. 3 is a block diagram illustrating a configuration of a server for performing a context-based read operation according to an exemplary embodiment of the present invention;

FIGS. 5A and 5B are flowcharts illustrating a context deletion request processing process according to an exemplary embodiment of the present invention;

FIGS. 6A and 6B are flowcharts illustrating a context-based read request processing process according to an exemplary embodiment of the present invention;

FIGS. 8A and 8B are diagrams illustrating a client context structure and a server context structure to be used in a readahead operation in which the server plays a leading role according to an exemplary embodiment of the present invention;

FIGS. 11A and 11B are flowcharts illustrating a context generation request processing process to be used in a readahead operation in which the server plays a leading role according to an exemplary embodiment of the present invention;

FIGS. 12A and 12B are flowcharts illustrating a context change request processing process to be used in a readahead operation in which the server plays a leading role according to an exemplary embodiment of the present invention;

FIGS. 13A and 13B are flowcharts illustrating a context deletion request processing process to be used in a readahead operation in which the server plays a leading role according to an exemplary embodiment of the present invention;

FIGS. 14A to 14C are flowcharts illustrating a readahead request processing process according to an exemplary embodiment of the present invention when an application program requests continuous reading;

FIGS. 15A to 15D are flowcharts illustrating a process in which the client requests the readahead operation according to an exemplary embodiment of the present invention;

FIGS. 16A and 16B are flowcharts illustrating a process in which the client processes a readahead reply received from the server according to an exemplary embodiment of the present invention; and FIGS. 17A and 17B are flowcharts illustrating a process in which the client processes a write request of an application according to an exemplary embodiment of the present invention.

DETAILED DESCRIPTION OF EXEMPLARY EMBODIMENTS

Figure 2A:
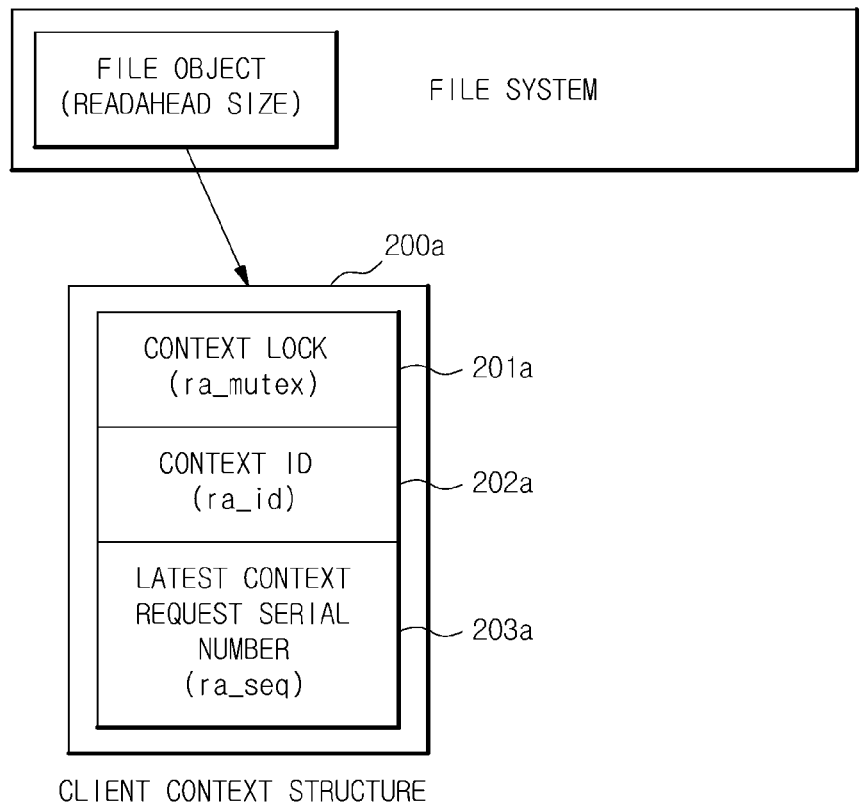
FIGS. 2A and 2B are diagrams illustrating a client context structure and a server context structure to be used in the read operation according to an exemplary embodiment of the present invention.

While exemplary embodiments of the invention are susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

Moreover, detailed descriptions related to well-known functions or configurations will be omitted in order not to unnecessarily obscure subject matters of the present invention.

As used herein, the singular forms "a," "an," and "the" are intended to include the plural forms as well, unless the context clearly indicates otherwise.

Moreover, as used herein, terms "module," "unit," and "interface" generally denote a computer-related object, which may be implemented in hardware, software, or combination thereof.

In addition, in the present specification, a "client file system" is briefly referred to as a "client."

In addition, in the present specification, chunks each having a maximum fixed length obtained by dividing an overall file or one file are collectively referred to as a file.

In the distributed file system, the client and the server simultaneously perform readahead operations in the distributed file system. When the client and the server have the same readahead size, sequential reading is effectively enabled if a reordering problem of the server is solved.

In the present invention, the server sequentially processes read requests by writing a latest request number in the context when an application program (or one process or thread) requests continuous reading so as to solve the reordering problem. That is, the client maintains and manages the latest request number for a corresponding context in a context structure for the file and transmits the request number to the server at the time of a read request. The server determines whether the corresponding request is a reordered request by comparing the request number included in the read request to a request number recently processed by the server. When the corresponding request is the reordered request, the read request is processed after waiting until the processing of a request previous to the read request is completed.

Hereinafter, a process of performing context-based continuous reading according to the exemplary embodiment of the present invention when the readahead size is the same between the client and the server will be described with reference to FIGS. 1 to 6B.

FIG. 1 is a diagram illustrating a process of performing a read operation according to an exemplary embodiment of the present invention.

First, the client (client file system) transmits a context generation request for a corresponding file to a server side so as to access a file (or chunk) (S110).

When the context generation request is received from the client, the server allocates a context ID to the corresponding file, generates a server context structure including the allocated context ID and an fd for the above-described file, and transmits the context ID to the client (S120). The context generation process of the server will be described later with reference to FIG. 4.

Thereafter, the client may transmit a plurality of read requests using the context ID for the corresponding file received from the server (S130 and S140). At this time, the client maintains a latest context request serial number in the context structure related to the corresponding file and transmits the latest context request serial number along with the context ID, an offset indicating a requested read position and read size information at the time of the read request. The server checks the latest context request serial number included in the read request and processes the read request after waiting until a previous read request is completed when the read request is the reordered request, so that it is ensured that the read requests are sequentially processed. The read request processing process will be described in further detail with reference to FIGS. 6A and 6B.

On the other hand, when there is no more access to the corresponding file, the client may transmit a context deletion request for the above-described file to the server (S150). The server receiving the context deletion request will delete the context structure for which the deletion request has been made. The context deletion process will be described later with reference to FIGS. 5A and 5B.

Figure 2B:
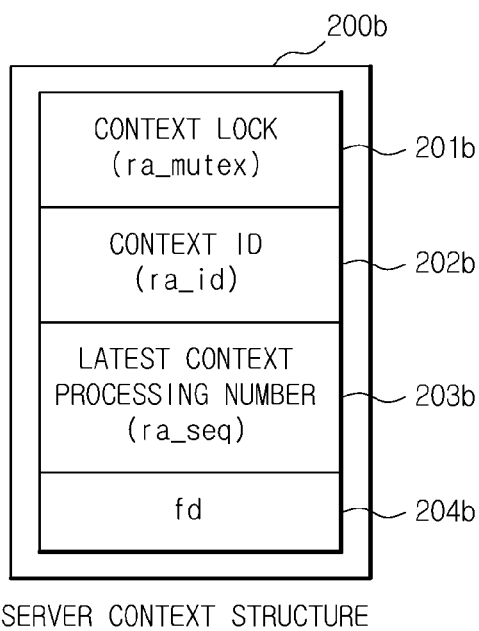

FIG. 2A is a diagram illustrating a client context structure generated and stored in the client according to an exemplary embodiment of the present invention, and FIG. 2B is a diagram illustrating a server context structure generated and maintained in the server. As illustrated, the client context structure 200a is generated and maintained in correspondence with a file object within the file system, and may include a context lock item 201a, a context ID 202a, and a latest context request serial number 203a.

The context lock item 201a is an item for controlling a concurrent request for a corresponding file, and may prevent the concurrent request for the corresponding file by locking the context structure for the corresponding file when a read request for a specific file is desired to be made.

The context ID 202a serves as an ID assigned by the server to a file (or chunk), and will be included in the read request for the corresponding file thereafter.

The latest context request serial number 203a is set to '0' and then initialized when the context structure is generated. The latest context request serial number 203a is incremented by '1' every time a request for a file related to the context is generated. The increased serial number is included in the read request along with the context ID.

On the other hand, a context structure 200b of the server generated and maintained in the server according to a context generation request of the client includes a context lock item 201b, a context ID 202b, and a latest context processing number 203b indicating a recently processed request number as in the context structure 200a of the client, and may further include an fd of a file object for the context in addition thereto.

FIG. 3 is a diagram illustrating a configuration of the server for performing a context-based read operation according to an exemplary embodiment of the present invention.

As illustrated in FIG. 3, the server may include a request queue 310, a request processing unit 320, a context management unit 330, and a data storage (or local file system 340).

The request queue 310 is a request storage for making requests received from the client wait so as to sequentially process the requests. In the exemplary embodiment, the request received from the client may include a context generation request, a context read request, and a context deletion request.

The request processing unit 320 sequentially reads and processes a request from the request queue 310 and returns a processing result to the client.

In the exemplary embodiment, when a request read from the request queue 310 is a context generation request, the request processing unit 320 generates a context structure for a file for which the context generation request has been made and registers the generated context structure in the context management unit 330. The request processing unit 320 stores a context ID allocated to the corresponding file in the generated context structure and initializes the latest context request serial number to 0.

In the exemplary embodiment, when the request read from the request queue 310 is a context read request, the request processing unit 320 reads the context structure for the file for which the read request has been made from the context management unit 330. The request processing unit 320 checks whether the latest context serial number included in the read request is the same as a value of (the latest context processing number stored in the context structure+1). When the two values are different, the request processing unit 320 recognizes that the corresponding request is a reordered request, stores the corresponding read request in the request queue 310 again, and makes the request wait. On the other hand, when the latest context serial number included in the read request is the same as the value of (the latest context processing number stored in the context structure+1), file data for which the read request has been made is read from the data storage 350, the read file data is transmitted to the client, and the latest context processing number of the context structure is incremented by 1.

In the exemplar embodiment, when the request read from the request queue 310 is a context deletion request, the request processing unit 320 deletes the context structure for the corresponding context from the context management unit 330.

The context management unit 330 stores and manages the context structure generated according to a request of the client.

Figure 4:
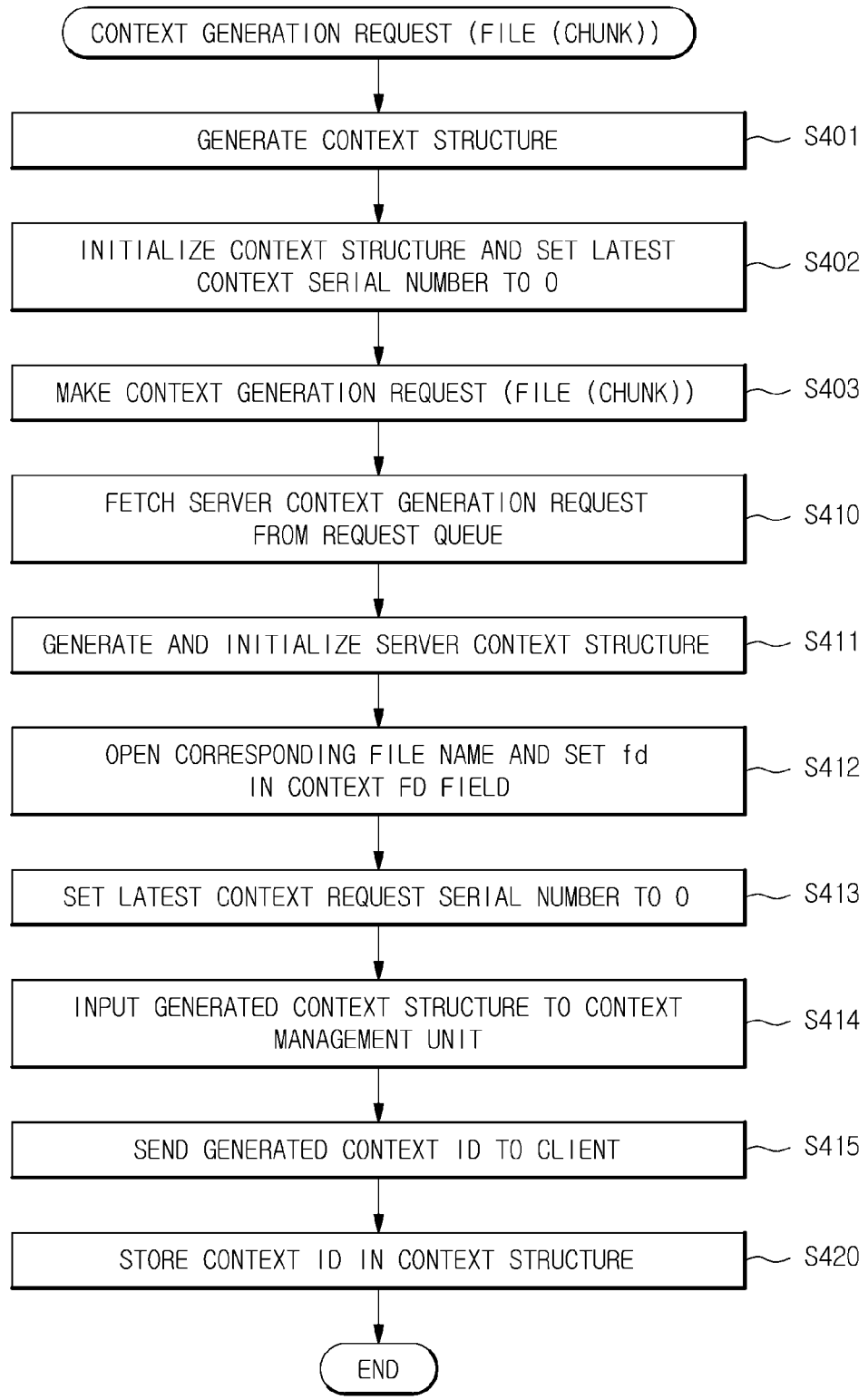
FIG. 4 is a flowchart illustrating a context generation request processing process according to an exemplary embodiment of the present invention.

FIG. 4 is a flowchart illustrating a context generation request processing process according to an exemplary embodiment of the present invention.

First, the client file system generates a context structure for a file requested by the application program, initializes the latest context request serial number of the context structure to 0, and then requests the server to generate the context for the corresponding file (S401 to S403).

Requests received from the client are sequentially stored in the request queue of the server and the server reads the context generation request from the request queue (S410).

The server allocates a new context number to a corresponding file in response to the context generation request to generate a server context structure, initializes the server context structure, and registers the initialized server context structure in the context management unit (S411 to S414). When the generation and registration of the context structure are completed, a context generation result including a context ID is transmitted to the client file system (S415).

The client file system receiving the context generation result stores the context ID received from the server in its own context structure (S420).

Figure 5B:
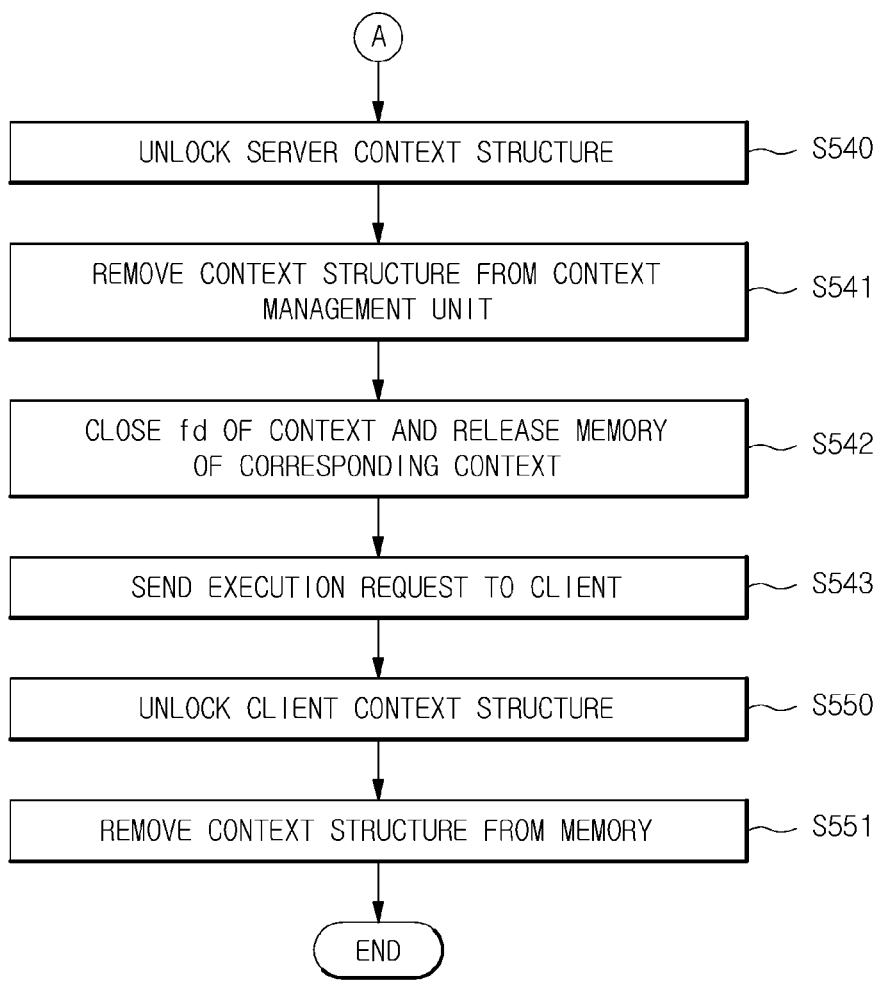

FIGS. 5A and 5B are flowcharts illustrating a context deletion request processing process according to an exemplary embodiment of the present invention.

When there is no more access to the file, the client file system may request the server to delete the context for the corresponding file. The context deletion request processing flow is processed to be similar to the context generation process illustrated in FIG. 4, and each of the client and the server releases the context structure maintained in its own position. However, when the latest context request serial number included in the context deletion request is different from a value of (the latest context processing number of the context structure of the server+1), the deletion request may be stored in the request queue again so as to make the deletion request wait until a previous request is processed.

First, the client file system locks the context structure in which the context deletion is desired to be requested and requests the server to delete the context (S501 and S502).

The context deletion request received from the client is stored in the request queue of the server and the server reads the context deletion request from the request queue (S510 and S511).

The server locks the context structure by reading a deletion target context structure from the context management unit and determines whether the latest context request serial number included in the deletion request is the same as a value of (the latest context processing number stored in the server context structure+1) (S513 to S530).

When the two values are the same, the context structure is unlocked, the corresponding context structure is removed from the context management unit, an fd of the context is closed, and the memory of the context is released, and an execution result is transmitted to the client (S540 to S543).

On the other hand, when the two values are different, it is recognized that the deletion request is the reordered request. After the corresponding context structure is unlocked, the deletion request is stored in the request queue again so as to make the deletion request wait until the processing of a request previous to the deletion request is completed (S530 and S510).

On the other hand, the client receiving the execution result for the deletion request unlocks the corresponding client context structure corresponding thereto and removes the corresponding context structure (S550 and S551).

Figure 6B:
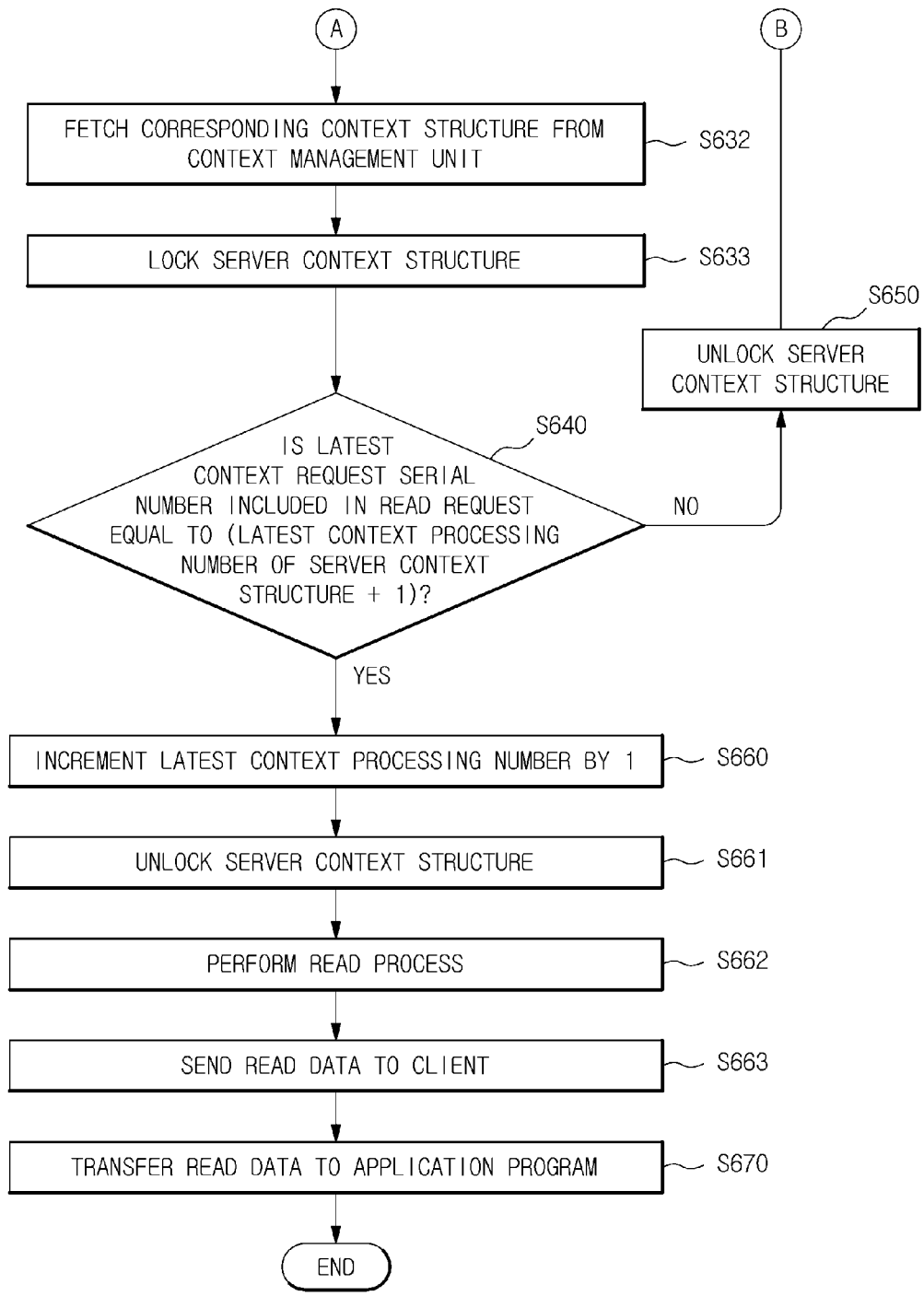

FIGS. 6A and 6B are flowcharts illustrating a context-based read request processing process according to an exemplary embodiment of the present invention.

At the time of a read request for a file of the user (or application program), it is checked whether there is a context structure for a file for which the read request has been made in the file system (S610). When there is no context structure, a context generation request processing process illustrated in FIG. 4 may be first performed by requesting the server side to generate the context (S611).

The client locks the corresponding context structure, increments the latest context request serial number stored in the context structure by "1," unlocks the context structure, and then transmits the read request to the server (S620 to S624).

In the exemplary embodiment, the read request may include a context ID, a latest context request serial number, an offset indicating a read request position, read size information, and a buffer address at which data is stored.

The server receiving the context-based read request reads the corresponding context structure from the context management unit after fetching the corresponding request from the request queue, and reads and locks the corresponding context structure (S630 to S633).

In order to prevent a continuous read request from being reordered, it is checked whether the latest context request serial number included in the read request is the same as a value of (the latest context processing number of the context structure of the server+1) (S640).

When the two values are different, it is recognized that the corresponding request is not an ordered request and the corresponding read request is inserted into the request queue again after the context structure is unlocked (S650 and S630).

On the other hand, when the latest context request serial number included in the read request is the same as the value of (the latest context processing number of the context structure of the server+1), that is, when it is identified that the corresponding request is the ordered request, the corresponding read request is processed, the latest context processing number of the server is incremented by "1," and a result is returned to the client (S660 to S663).

The client receiving the result for the read request transfers the result to the application program (S670).

The exemplary embodiments described above with reference to FIGS. 1 to 6B are directed to solve the reordering problem when the file systems of the client and the server have the same readahead size in the distributed file system.

However, the file systems of the client and the server may have different readahead sizes in the distributed file system. For example, the server may provide a service using a plurality of block devices in various forms (that is, different readahead polices). In addition, an asymmetric distributed file system may divide one file into parts each having a fixed size (for example, 64 MB) and store and manage the parts in storage devices of servers. In this case, one fixed readahead policy of the client may frequently mismatch readahead policies for storages of various servers.

The present invention proposes a method in which the client does not perform the readahead operation and the server plays a leading role in performing the readahead operation so as to solve a readahead policy mismatch between the client and the server in the distributed file system.

Figure 7:
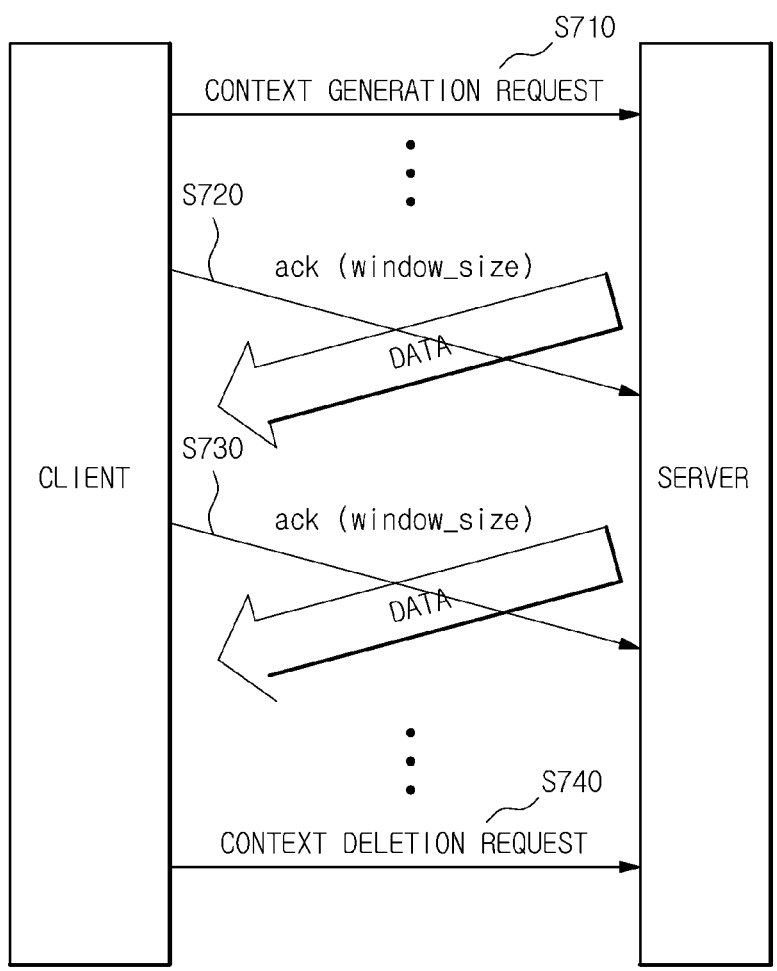
FIG. 7 is a diagram illustrating a process of performing a readahead operation in which the server plays a leading role according to an exemplary embodiment of the present invention.

FIG. 7 is a diagram illustrating a process in which the server plays a leading role in performing a readahead operation according to an exemplary embodiment of the present invention.

When the application program requests reading on a specific file (or chunk), the client transmits a context generation request for the corresponding file (or chunk) to the server (S710). At this time, the context generation request may include an offset and readahead size information for a read target file.

In response to this, the sever generates a context structure including a context ID and an fd for the aforementioned file, performs the readahead operation on data corresponding to a maximum readahead size from the corresponding file, and transmits the data read in advance to the client. The data received from the server is stored in a readahead buffer of the client.

When a predetermined amount of the readahead buffer is consumed by the application program, the client may request the server to perform a readahead operation by transmitting an acknowledgement (ack) to the server (S720 and S730). In response to the ack, the server increases a readahead window size and transmits already read data to the client simultaneously when the readahead operation is performed.

Thereafter, when it is determined that the client does not need to maintain the context for the corresponding file any more, the context deletion request may be transmitted to the server (S740).

That is, in the present invention, the server performs the readahead operation in a network protocol level, so that the data read in advance is stored in the readahead buffer (or file system cache) of the client. For this, the client maintains a readahead buffer having a size twice a maximum readahead size of the server and a readahead request is transmitted to the server when half of the readahead buffer is consumed by the application program. The server enlarges a readahead window size and asynchronously performs the readahead operation, so that the performance of continuous reading is maximized.

FIGS. 8A and 8B are diagrams illustrating a client context structure and a server context structure to be used in the readahead operation in which the server plays a leading role according to an exemplary embodiment of the present invention.

As illustrated in FIG. 8A, the client context structure may include a context ID (ra_id) received from the server, a context lock item (ra_mutex), a maximum readahead size (max_ra_size) of the server, a context version number (ra_ver), a latest context request serial number (ra_seq), a readahead start position (ra_start), a readahead request size (ra_size), and an asynchronous readahead request size (ra_asyn_size).

In the exemplary embodiment, the asynchronous readahead request size (ra_asyn_size) may be increased to be twice the maximum readahead size of the server when continuous reading of the application program is occurred in the readahead operation of the local file system.

As illustrated in FIG. 8B, in addition to the context ID (ra_id) and the fd, the server context structure may include a context lock item (ra_mutex) for concurrency control of request processing for the context, a maximum readahead size (max_ra_size) of the server, a context version number (ra_ver), a latest context processing number (ra_seq) indicating a recently processed request number for the context, a readahead size (ra_size), and a memory buffer address (buf).

Figure 9:
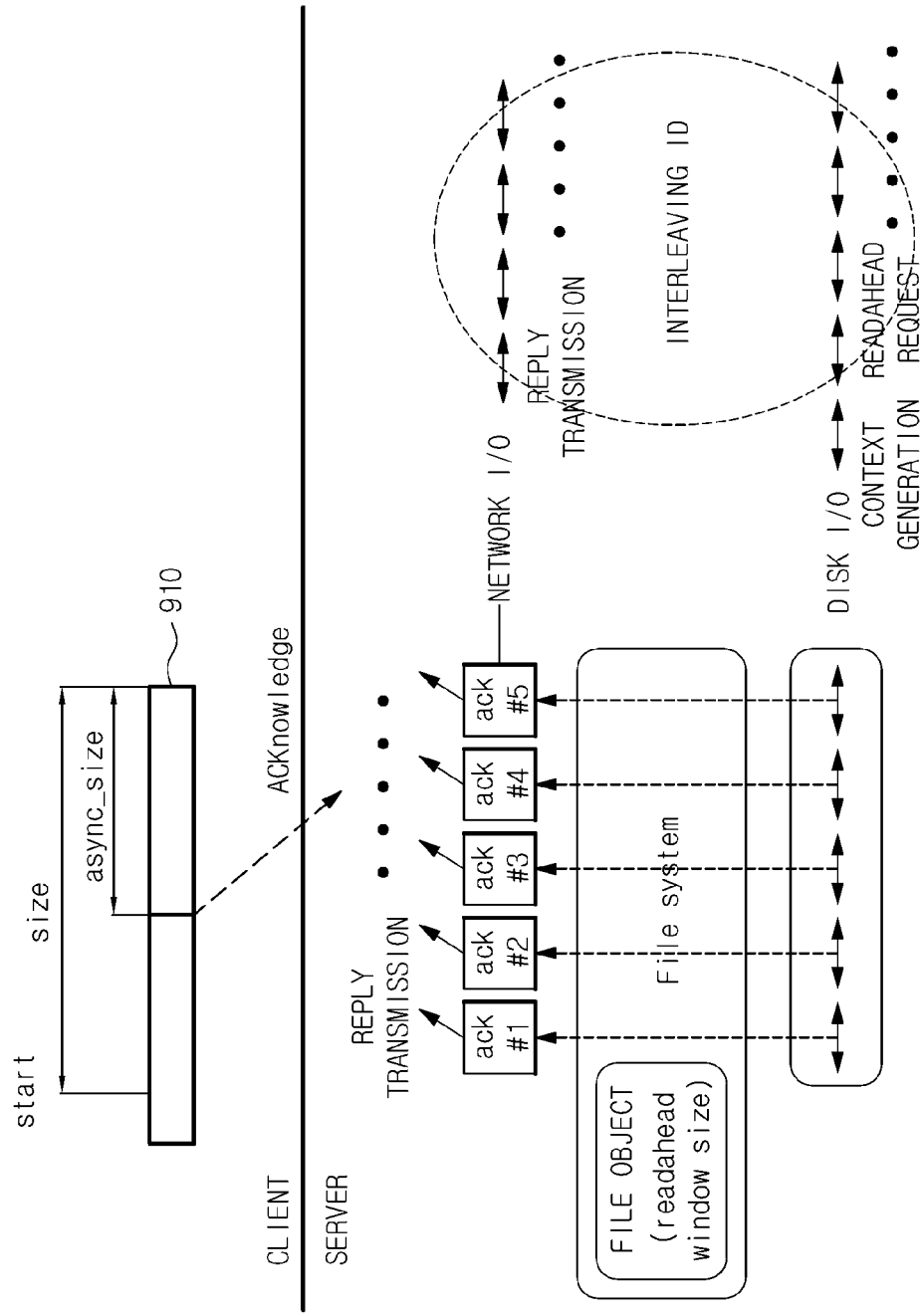
FIG. 9 is a diagram conceptually illustrating a readahead processing process according to an exemplary embodiment of the present invention.

FIG. 9 is a diagram conceptually illustrating a readahead processing process of a network protocol level in which the server plays a leading role according to an exemplary embodiment of the present invention.

The client is provided with a readahead buffer (or file system cache) 910 having a size which is twice the maximum readahead size for the corresponding file acquired from the server so as to support the readahead operation for the specific file, and may store data read through the asynchronous readahead operation of the server in correspondence with the continuous read request of the application program in the buffer 910.

When half of the readahead buffer 910 is consumed through the continuous reading of the application program, that is, when the size of the remaining data that is not yet read by the application program in the readahead buffer is less than the asynchronous readahead request size (async_size), an Ack is transmitted to the server, so that the server is requested to perform a readahead operation on data corresponding to async_size.

The server receiving the Ack increases the readahead window size for the corresponding context by async_size. The disk read operation and network transmission on data corresponding to the increased size are continuously performed.

The local file system of the server performs not only a reading operation for a corresponding request but also an asynchronous readahead operation for the next position, when the continuous reading is requested. In such readahead operation of the server, the disk read operation and the network transmission are performed in an interleaving manner, so that effective continuous reading may be performed.

Figure 10:
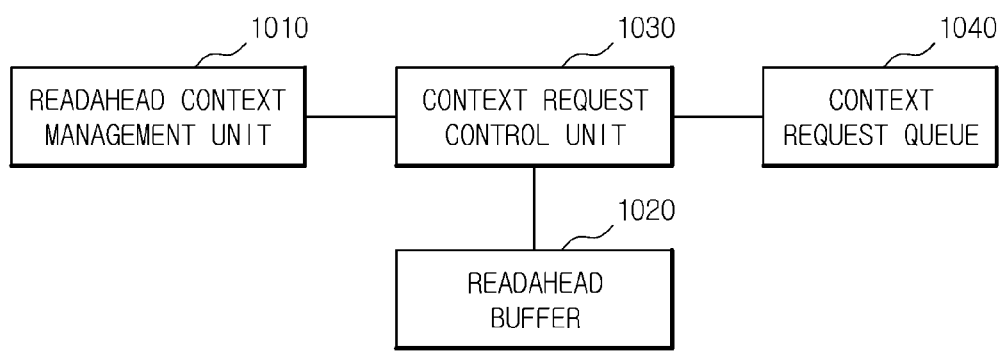
FIG. 10 is a block diagram illustrating a configuration of a client that requests the readahead operation in which the server plays a leading role according to an exemplary embodiment of the present invention.

FIG. 10 is a block diagram illustrating a configuration of a client that requests the readahead operation in which the server plays a leading role according to an exemplary embodiment of the present invention.

In the exemplary embodiment, the client may include a readahead context management unit 1010, a readahead buffer 1020, a context request control unit 1030, and a context request queue 1040.

The readahead context management unit 1010 generates and manages a client context structure for a readahead operation of the server. The client context structure has also been described above with reference to FIG. 8A.

The readahead buffer 1020 is a memory buffer for maintaining and managing data read from the server through the readahead operation.

In the exemplary embodiment, the size of the readahead buffer 1020 is twice the maximum readahead size received from the server.

In the exemplary embodiment, a data structure 1021 of the readahead buffer 1020 may include a field of an address (rbuf_offset) at which data actually read in advance starts in the buffer 1020 for use in the circular form, a readahead buffer size (rbuf_size) field, and a readahead buffer lock (rbu_mutex) field for concurrency control. The data start address (rbuf_offset) is calculated according to rbuf_offset= (rbuf_offset+size) % (2*max_readahead_size) for the circular use of the buffer.

In addition, the data structure 1021 of the readahead buffer 1020 may further include an error field for storing an error value received from the server after the readahead operation is performed.

When there is no data for which the continuous read request has been made from the application program in the readahead buffer (when the readahead operation is not performed or when the readahead request is made but there is no corresponding data in the buffer), the context request control unit 1030 generates a readahead request, inserts the generated readahead request into the request queue 1040, and waits until data is stored in the readahead buffer.

In the exemplary embodiment, an 'empty_wakeup_all' field of the data structure 1041 of the request queue 1040 is a field for registering a wakeup target process or thread after all requests waiting in the request queue 104 are completely processed, and a 'req_queue_mutex' field is a field for concurrency control of the request queue.

FIGS. 11A and 11B are flowcharts illustrating a context generation request processing process to be used for the readahead operation in which the server plays a leading role according to an exemplary embodiment of the present invention. Although the context generation processing flowcharts of FIGS. 11A and 11B are similar to that of FIG. 4, the flowcharts of FIGS. 11A and 11B are characterized in that readahead window information is additionally included in a context structure generated according to a context generation request for the specific file of the client, data corresponding to a maximum read size of the readahead window is read from the corresponding file, and the read data is transmitted in advance to the client. In addition, the client maintains a readahead buffer having a size which is twice the maximum readahead size of the server by acquiring information of the maximum readahead size of the corresponding file from the server and maintains and manages readahead context structure information.

Specifically, the client generates a context structure for a file requested by the user (or application program) and requests the server to generate the context for the corresponding file after initializing the latest context request serial number of the context structure to '0' (S1101 to S1103). At this time, the context generation request may include an offset and readahead size information along with a context generation target file ID.

Requests received from the client are sequentially stored in a request queue of the server and the server reads a context generation request from the request queue (S1110).

The server generates the server context structure after allocating a new context number for a corresponding file in response to the context generation request, and transmits corresponding context structure information to the client after setting an fd, a readahead size, and a latest context processing number to be included in the corresponding context structure (S1111 to S1130).

Specifically, the corresponding file name is open and the fd is set in an fd field of the context structure (S1112), a read position of the fd is shifted by the offset (S1113), a readahead size (ra_size) of the context structure is set as readahead size information included in the context generation request (S1114), the latest context processing number is set to 0 (S1115), and a maximum readahead size for the corresponding fd is fetched (S1116).

When the above-described generated context information is transmitted to the client (S1130), the client stores the received context information in the context structure generated in step S1101 and registers the received context information in the context management unit (S1150 and S1151).

On the other hand, the server locks the generated context structure (S1120) and reads data corresponding to the readahead size (ra_size) set in the context structure from the corresponding file (S1121). Next, the server sets the readahead size (ra_size) of the context structure to 0 (S1122), and unlocks the context structure (S1123).

Figure 12A:
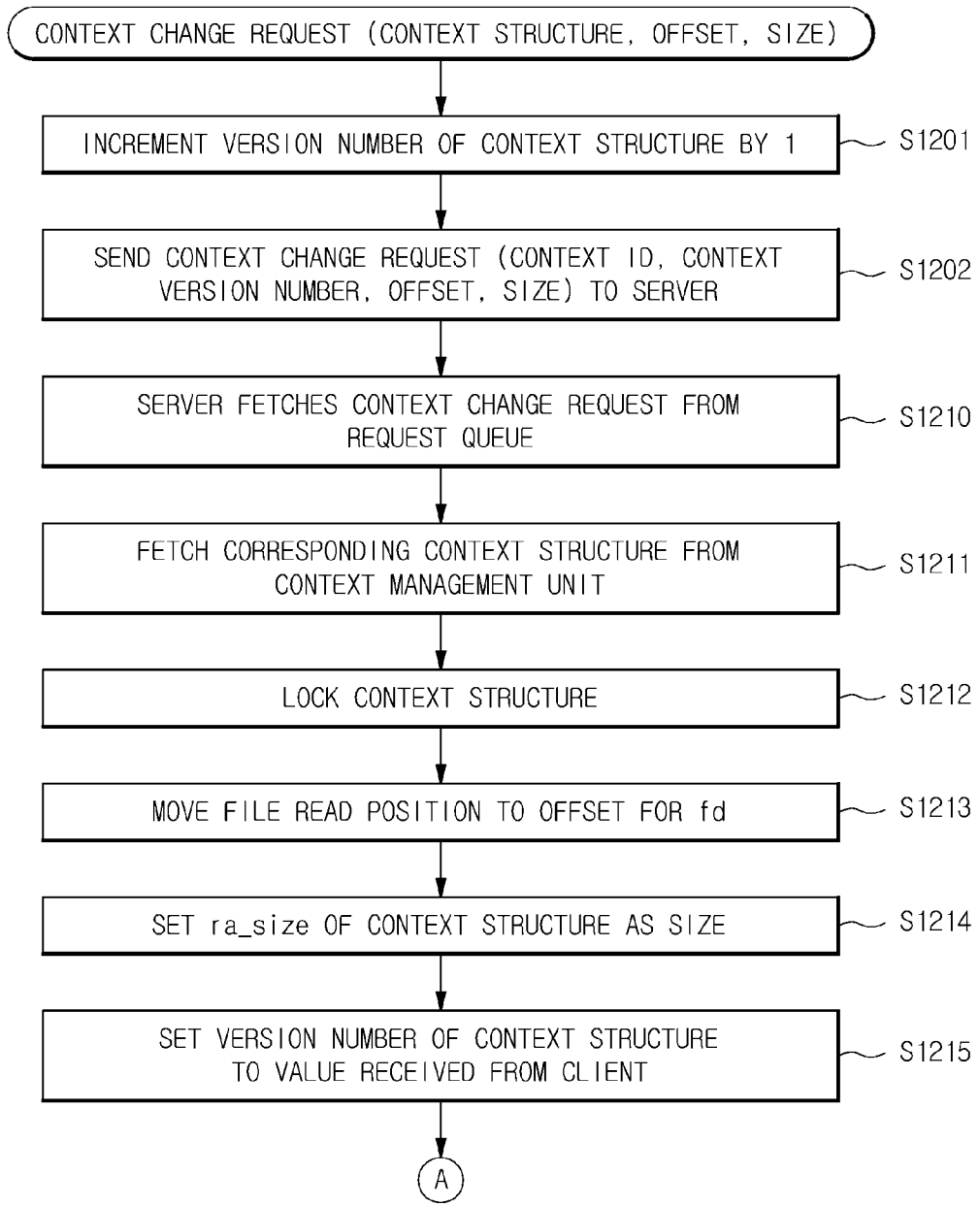

FIGS. 12A and 12B are flowcharts illustrating a context change request processing process for the readahead operation in which the server plays a leading role according to an exemplary embodiment of the present invention.

The context change process may be performed when random reading is requested. Although the context change process is similar to the context generation processing process illustrated in FIGS. 11A and 11B, a difference is that the client increases a version number of the context structure. The server receiving the context change request changes the read position of the fd of the context structure by an offset, a readahead operation is performed on data corresponding to ra_size for the changed context simultaneously with the transmission of changed context information to the client after the context change, and data read in advance is transmitted to the client.

Specifically, after the client increases the version number to represent the context change in the context structure (S1201), a context change request is transmitted to the server (S1202). At this time, the context change request may include a change target context ID, a context version number, an offset, and readahead size information.

Requests received from the client are sequentially stored in the request queue of the server and the server reads the context change request from the request queue (S1210).

The server reads the corresponding context structure from the context management unit (S1211) and locks the context structure (S1212). Next, the readahead position of the fd for the corresponding file is shifted by an offset (S1213), the readahead size (ra_size) of the context structure is set as the readahead size information included in the context change request (S1214), the version number of the context structure is set to the version number received from the client (S1215), and the context structure is unlocked (S1216).

When the above-described changed context information is transmitted to the client, the client changes information of the context structure based on the received context information (S1240). On the other hand, the server locks the changed context structure (S1220) and reads data corresponding to the readahead size (ra_size) set in the context structure from the corresponding file to transmit the read data to the client (S1221). Next the readahead size (ra_size) of the context structure is set to 0 (S1222) and the context structure is unlocked (S1223).

FIGS. 13A and 13B are flowcharts illustrating a context deletion request processing process for the readahead operation in which the server plays a leading role according to an exemplary embodiment of the present invention.

When it is determined that it is unnecessary to maintain the context for the readahead operation any more, the client may request the server to delete the corresponding context.

Specifically, the client increments the latest context request serial number of the context structure desired to be deleted by 1 (S1301) and requests the server to delete the context (S1302). At this time, the context deletion request may include a deletion target context ID, a context version number, and a latest context request serial number.

The context deletion request received from the client is stored in the request queue of the server (S1310) and the server reads the context deletion request from the request queue (S1311).

The server reads the deletion target context structure from the context management unit, locks the context structure, and determines whether the latest context request serial number included in the deletion request is the same as a value of (the latest context processing number stored in the server context structure+1) (S1311 to S1313).

When the two values are different, it is recognized that the corresponding request is a reordered request, the corresponding context structure is unlocked, and then the corresponding deletion request is stored in the request queue again so as to wait until the processing of a request previous to the deletion request is completed (S1330 and S1310).

On the other hand, when the two values are the same, it is determined whether the context version number included in the deletion request is the same as the version number stored in the server context structure, the context structure is unlocked, the context structure is removed from the context management unit, and an execution result is transmitted to the client (S1350 to S1352).

On the other hand, when the context version number included in the deletion request is different from the version number stored in the server context structure, the process proceeds to step S1352.

Figure 14B:
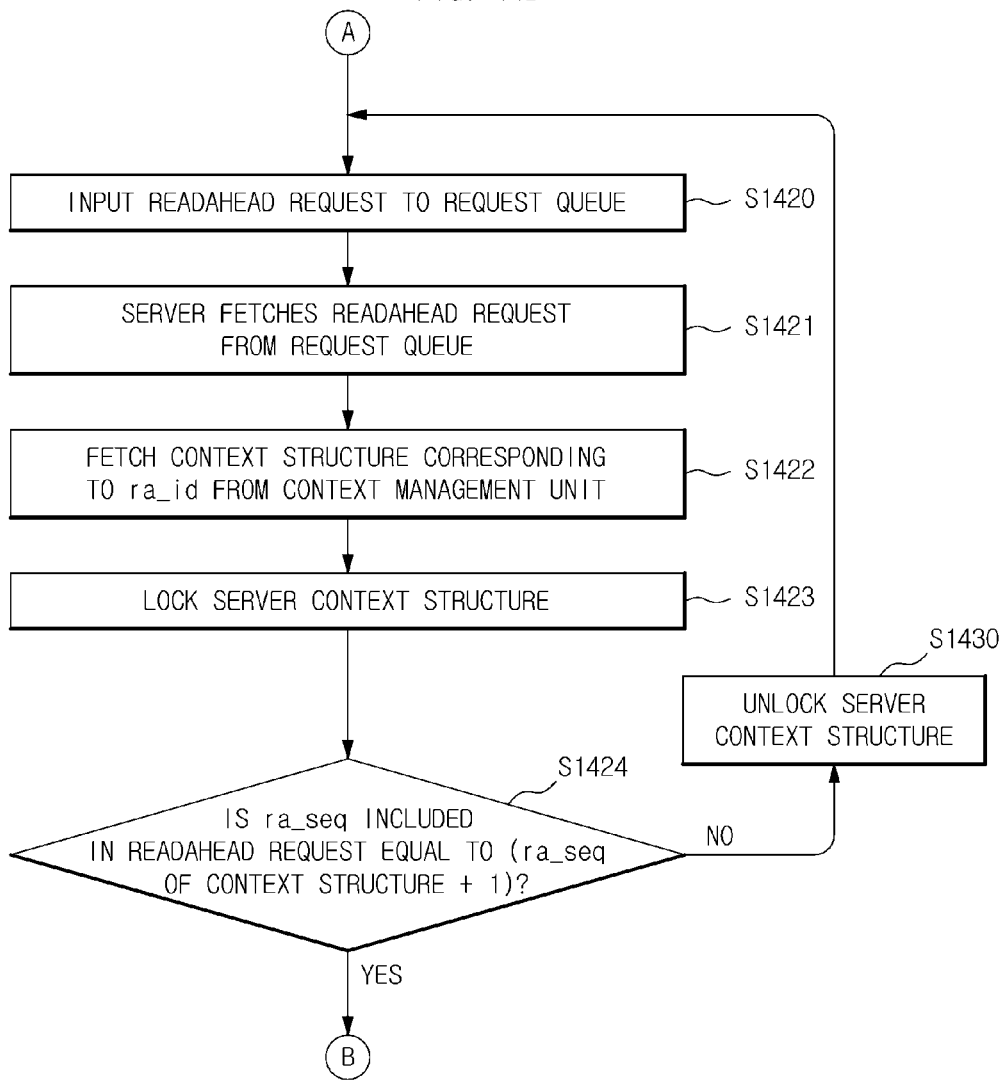

FIGS. 14A, 14B and 14C are flowcharts illustrating an asynchronous readahead request processing process according to an exemplary embodiment of the present invention when an application program requests continuous reading.

A size of the remaining data which is not yet read by the application program within the readahead buffer is checked (S1401). When the size of the remaining data is less than an asynchronous request size (ra_async_size) set in the context structure of the client, the latest context request serial number of the corresponding context structure is incremented by 1 (S1410) and the ack for the readahead request is transmitted to the server (S1411). At this time, the readahead request may include information about a context ID, a context version number, a latest context request serial number, and an asynchronous request size.

In addition, the client may update the asynchronous request size (ra_async_size) of the client when necessary.

ra_async_size is compared to a value of the maximum readahead size (max_ra_size)/16 (S1461). When ra_async_size is smaller, ra_async_size*4 is set (S1462). Otherwise, ra_async_size*2 is set (S1463). ra_async_size may be updated to a minimum value among these values (S1470).

On the other hand, the asynchronous readahead request is stored in the request queue (S1420) and the server reads the asynchronous readahead request (S1421).

The server reads a context structure corresponding to the context ID included in a corresponding request from the context management unit and lock the context structure (S1422 and S1423).

The server compares the latest context request serial number included in the asynchronous readahead request to a value of (the latest context processing number of the read context structure+1) (S1424). When these values are different, it is recognized that the request is a reordered request. The context structure is locked (S1430) and the corresponding request is inserted into the request queue again (S1420).

On the other hand, when the latest context request serial number is the same as the value of (the latest context processing number of the read context structure+1), version numbers are compared (S1440). When the version numbers are the same, the latest context processing number of the context structure is incremented by 1 (S1441). ra_size of the context structure is set to the requested ra_async_size, and data corresponding to ra_size of the context structure is read through the fd of the context structure and stored in the readahead buffer (S1442). Next, ra_size of the context structure is reset to 0 (S1443), the context structure is unlocked (S1444), and then a reply message including the data stored in the readahead buffer is transmitted to the client (S1445).

FIGS. 15A to 15D are flowcharts illustrating a process in which the client processes a read request of an application program through an asynchronous readahead operation in which the server plays a leading role according to an exemplary embodiment of the present invention.

First, the client file system receiving the read request from the application program checks whether there is a context structure for a file for which the read request has been made (S1501). When there is no corresponding context structure, a context generation request is transmitted to the server and a context structure is generated and initialized as illustrated in FIGS. 11A and 11B (S1502).

On the other hand, when there is a corresponding context structure, the context structure is locked (S1503) and it is determined whether the corresponding structure is in an initialized state by checking a value stored in the context structure (S1504). In the case of the initialized state, a context generation request is sent to the server (S1505).

On the other hand, when context information is already stored in the corresponding context structure, the client compares a readahead start portion (ra_start) included in the context structure to an offset included in the read request and determines whether the read request is a continuous read request or a random read request (S1510).

When the readahead start position (ra_start) is the same as the offset of the read request, it is recognized that the request is the continuous read request, and the client requests the server to perform an asynchronous readahead operation (S1511). Next, the context structure is unlocked (S1512) and the lock (rbuf_mutex) of the readahead buffer is acquired (S1513).

The client determines whether there is data for which the read request has been made in the readahead buffer (S1514).

When the data is present in the readahead buffer, the data is copied to a user buffer and rbuf_offset and rbuf_size of the readahead buffer are updated (S1540 to S1544 and 51550 and S1551). Here, rbuf_offset and rbuf_size of the readahead buffer are updated for use as a circular buffer.

When there is no data for which the read request has been made in the readahead buffer, a readahead request is generated, the generated readahead request is inserted into the readahead request queue, and the readahead request waits (S1515 to S1519).

On the other hand, when the readahead start position (ra_start) is different from the offset of the read request, it is recognized that random reading has occurred and a context change request is sent to the server after waiting until the processing of a previous readahead request is completed (S1520 to S1525).

Specifically, after the lock (req_queue_mutex) of the readahead request queue is acquired (S1520), it is determined whether a readahead request queue is empty (S1521). When the readahead request queue is empty, it is recognized that all previous readahead requests have been completed, the lock (req_queue_mutex) of the readahead request queue is unlocked (S1530), and a context change request may be sent to the server (S1525).

However, when the readahead request queue is not empty, it waits for relevant processing to be completed. The context change request is registered in the empty_wakeup_all field of the request queue (S1522), the lock (req_queue_mutex) of the readahead request queue is unlocked (S1523), and the context change request waits (S1524) and is sent to the server after all previous readahead requests are processed (S1525). Thereafter, the asynchronous readahead request is performed using the changed context information (S1511).

Figure 16B:
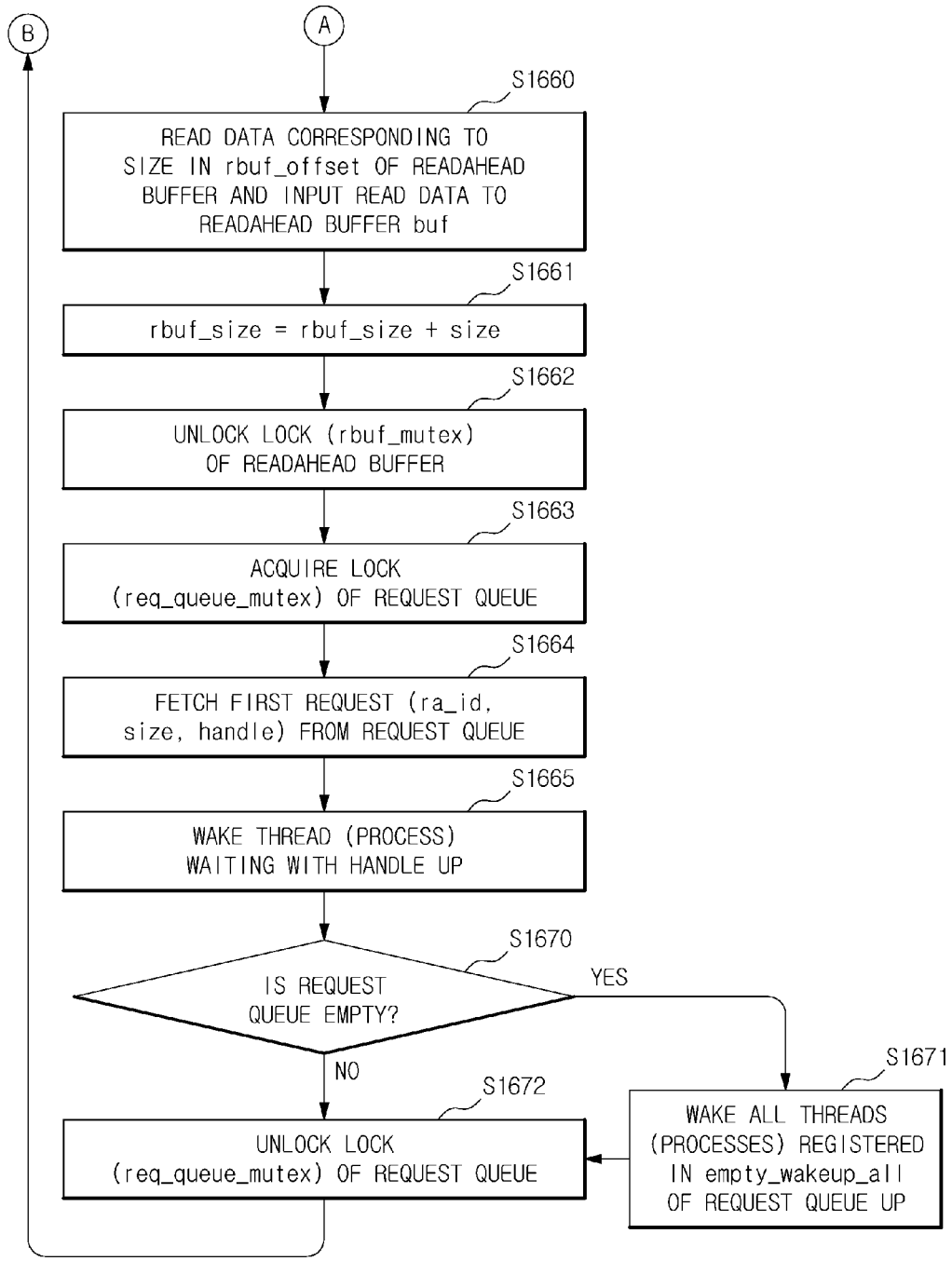

FIGS. 16A and 16B are flowcharts illustrating processing of a readahead reply received from the server according to an exemplary embodiment of the present invention.

When a reply for the readahead operation is received from the server (S1601), a context structure corresponding to a readahead ID (ra_id) received in the reply is fetched from the readahead context management unit and the context structure is locked (S1611 and S1612).

A context version number (ra_ver) included in the reply is compared to a version number (w.ra_ver) of the context structure (S1620), and it waits for another reply message to be received from the server if the version numbers are different (S1601).

When the context version numbers are the same, corresponding data is recorded to the readahead buffer. A scheme of recording data to the readahead buffer is a scheme of inserting data into a circular buffer (S1630, S1640, S1650, S1651, S1660, S1661, S1662, and S1663).

After the data insertion into the readahead buffer is completed, a request that waits for a request result to be received is found from the readahead request queue and removed from the request queue and a request that waits for a corresponding request to be completed wakes up (S1664). When the request is removed from the request queue and the request queue is empty, all processes and threads registered in empty_wakeup_all wake up (S1670 and S1671).

On the other hand, the problem of consistency occurs when the readahead buffer is implemented with an independent buffer rather than a file system page cache and it is necessary to solve the problem. A flowchart illustrating a process of processing a write request of the user according to the exemplary embodiment of the present invention for solving this problem is illustrated in FIGS. 17A and 17B.

When the write request region of the application program is within a readahead window region, it is necessary to invalidate the readahead buffer. When a previous readahead request is present in the readahead request queue, the readahead buffer is invalidated after it waits for the processing of the previous request to be completed. After the readahead buffer is invalidated, the context deletion request is transmitted to the server and the corresponding context structure is initialized.

Specifically, it is determined whether there is a context structure of a file for which a write request has been made. When there is no context structure for the file, a context structure is generated and initialized (S1701 and S1702).

When the context structure is present, the context structure is locked and it is determined whether the context structure is in an initialized state (S1720).

In the case of the initialized state, the context structure is unlocked (S1756) and the process ends.

On the other hand, when the context structure is not in the initialized state, it is determined whether a write request position is within a readahead window region using a readahead start position and readahead size information (S1730).

When it is determined that the write request region is within the readahead window region, the latest context request serial number of the context structure is incremented by 1, the request queue is locked, the readahead buffer is invalidated (that is, the readahead buffer content is discarded), and a corresponding context deletion request is sent to the server (S1751 to S1755).

Next, the context structure is initialized and unlocked (S1755 and S1756).

After the file of the application is used, the process may be performed according to the above-described process even when the file close is called.

Meanwhile, the apparatus and method according to the exemplary embodiments of the present invention as described above may be implemented as a program command type that may be executed through various computer means and may be recorded in a computer readable medium. The computer readable medium may include program commands, data fields, a data structure, and the like, alone or a combination thereof.

The program commands recorded in the medium are specially designed and configured for the present invention or may be used by being known to those skilled in the art of computer software. An example of the computer readable recording medium may include magnetic media such as hard disk, floppy disk, magnetic tape, and the like, optical media such as CD-ROM, DVD, and the like, magneto-optical media such as floptical or optical disk, and hardware devices specially configured to store and perform program commands such as ROM, RAM, flash memory, and the like. In addition, the medium may be a transmission medium such as light, a metal line, a waveguide, and the like, including a carrier transmitting a signal designating a program command, data architecture, and the like. An example of the program commands may include a machine language code made by a compiler and a high-level language code executable by a computer using an interpreter, and the like.

The above-mentioned hardware devices may be configured to be operated as at least one software module so as to perform an operation of the present invention, and vice versa.

This invention has been particularly shown and described with reference to preferred embodiments thereof. It will be understood by those skilled in the art that various changes in form and details may be made therein without departing from the spirit and scope of the invention as defined by the appended claims. Accordingly, the referred embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A method of reading data in a distributed file system, the method comprising:
   generating, by a server, a context structure including a context identifier (ID) and a file descriptor (fd) for a file when a context generation request for a read target file is received from a client and transmitting the context ID to the client;
   receiving, by the server, a plurality of read requests, each read request including a context ID, a latest context request serial number, an offset indicating a requested read position, and read size information corresponding to the file; and
   sequentially processing, by the server, the plurality of read requests by referring to the context request serial number included in each read request,
   wherein the sequentially processing of the plurality of read requests includes:
      determining whether the read request is a reordered request by comparing a context processing request serial number included in the read request to a latest context processing number included in the context structure of the server,
      making the read request wait until processing for a request previous to the read request is completed in case that the read request is the reordered request, and
      processing the read request after processing for the previous request is completed.

2. The method of claim 1, wherein the context structure generated by the server further includes a context lock item for concurrency control of request processing for the context.

3. The method of claim 1,
   wherein the context structure generated by the server further includes a latest context processing number indicating a recently processed request number for the context, and
   wherein the latest context processing number is initially set to 0 and incremented by 1 every time a request for a file related to the context is processed.

4. The method of claim 1,
   wherein the context structure including the context ID received from the server is generated and stored in the client,
   wherein the context structure of the client further includes a context lock item for concurrency control of request processing for the context and a latest context request serial number in addition to the context ID, and
   wherein the latest context request serial number is initially set to 0 and incremented by 1 every time a request for a file related to the context is generated.

5. The method of claim 1, further comprising:
   when a deletion request for the generated context is received from the client,
   determining whether the deletion request is a reordered request by comparing a context processing request serial number included in the deletion request to a latest context processing number included in the context structure of the server;

making the read request wait until processing for a request previous to the read request is completed when the deletion request is the reordered request; and deleting the context structure for which the deletion request has been made after the processing for the previous request is completed.

6. A method of reading data in a distributed file system, the method comprising:

when a context generation request including an offset and readahead size information for a read target file is received from a client, generating, by a server, a context structure including a context identifier (ID) and a file descriptor (fd) for a file and transmitting the context ID to the client;

performing a readahead operation on the file based on the offset and the readahead size information included in the context generation request and transmitting data read in advance to the client; and when continuous reading on the file is requested from an application program to be executed in the client, transmitting, by the client, a readahead request including asynchronous readahead request size information to the server if a size of the remaining data of a readahead buffer, which has not been yet read by the application program, is less than a preset asynchronous readahead request size;

performing, by the server receiving the readahead request, an asynchronous readahead operation with the asynchronous readahead request size on the file; and transmitting data read in advance to the client, wherein the readahead request further includes a context processing request serial number, and wherein the performing of the readahead operation includes:

determining whether the readahead request is a reordered request by comparing a context processing request serial number included in the readahead request to a latest context processing number included in the context structure of the server; and processing the readahead request after the readahead request waits until processing for a request previous to the readahead request is completed when it is determined that the readahead request is the reordered request.

7. The method of claim 6, wherein the context structure generated by the server further includes at least one of a context lock item for concurrency control of request processing for the context, a maximum readahead size of the server, a context version number, a latest context processing number indicating a recently processed request number for the context, a readahead size, and a memory buffer address in addition to the context ID and the fd, and wherein the latest context processing number is initially set to 0 and incremented by 1 every time a request for a file related to the context is processed.

8. The method of claim 7, wherein the context structure including the context ID received from the server is generated and stored in the client, wherein the context structure of the client further includes at least one of a context lock item, a maximum readahead size of the server, a context version number, a latest context request serial number, a readahead start position, a readahead request size, and asynchronous readahead request size information in addition to the context ID, and wherein the latest context request serial number is initially set to 0 and incremented by 1 every time a request for a file related to the context is generated.

9. The method of claim 6, wherein the data read in advance transmitted to the client is stored in a readahead buffer of the client, and wherein a readahead buffer size of the client is twice a maximum readahead size of the server.

10. The method of claim 9, wherein the readahead buffer is a circular buffer.

11. The method of claim 6, wherein the preset asynchronous readahead request size is able to be increased to a maximum readahead size of the server.

12. The method of claim 6, further comprising:

when a random read operation on the file is requested from an application program to be performed by the client, increasing, by the client, a context version number within a context structure related to the file and transmitting a context change request including the increased version number, a context ID, an offset, and readahead size information to the server; and changing, by the server receiving the context change request, a context version number of the context structure for which the change request has been made to a version number included in the change request, performing a readahead operation on the file using the offset and the readahead size information included in the change request, and transmitting data read in advance to the client.

13. The method of claim 6, further comprising:

when a deletion request for the generated context is received from the client, determining whether the deletion request is a reordered request by comparing a context processing request serial number included in the deletion request to a latest context processing number included in the context structure of the server;

making the read request wait until processing for a request previous to the read request is completed when it is determined that the deletion request is a reordered request; and deleting a context structure for which the deletion request has been made after the processing for the previous request is completed.

* * * * *